(12) United States Patent
Suzuki

(10) Patent No.: US 6,917,450 B2
(45) Date of Patent: Jul. 12, 2005

(54) COMMUNICATION TERMINAL APPARATUS AND COMPUTER APPARATUS

(75) Inventor: Osamu Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/156,430

(22) Filed: May 28, 2002

(65) Prior Publication Data

US 2002/0149797 A1 Oct. 17, 2002

Related U.S. Application Data

(63) Continuation of application No. 08/983,609, filed as application No. PCT/JP97/01509 on May 1, 1997, now Pat. No. 6,452,688.

(30) Foreign Application Priority Data

May 2, 1996 (JP) .............................................. 8-134161
Apr. 25, 1997 (JP) .............................................. 9-121453

(51) Int. Cl.[7] ................................................. H04N 1/32
(52) U.S. Cl. ...................... 358/442; 358/434; 358/468; 379/100.01
(58) Field of Search ................................ 358/400, 403, 358/405, 407, 434, 440, 468, 1.15, 442, 444, 404; 359/404; 379/100.01, 100.05, 100.06, 100.09, 88.22, 106.01

(56) References Cited

U.S. PATENT DOCUMENTS

| | | | |
|---|---|---|---|
| 4,578,537 A | 3/1986 | Faggin et al. | |
| 4,974,254 A | 11/1990 | Perine et al. | |
| 5,155,602 A | 10/1992 | Terajima | |
| 5,225,997 A | 7/1993 | Lederer et al. | |
| 5,355,365 A | * 10/1994 | Bhat et al. | 379/93.31 |
| 5,388,204 A | 2/1995 | Ikeda et al. | |
| 5,432,618 A | 7/1995 | Monnot et al. | |
| 5,477,339 A | 12/1995 | Sugawara et al. | |
| 5,608,546 A | 3/1997 | Nakamura et al. | |
| 5,617,221 A | 4/1997 | DeVries | |
| 5,625,467 A | 4/1997 | Kurokawa | |
| 5,644,404 A | 7/1997 | Hashimoto et al. | |
| 5,644,625 A | 7/1997 | Solot | |
| 5,708,909 A | 1/1998 | Yamashita | |
| 5,737,592 A | 4/1998 | Nguyen et al. | |
| 5,740,230 A | 4/1998 | Uaudreuil | |
| 5,768,483 A | 6/1998 | Maniva et al. | |
| 5,790,639 A | 8/1998 | Ranalli et al. | |
| 5,825,769 A | 10/1998 | O'Reilly et al. | |
| 5,872,901 A | 2/1999 | Konno et al. | |
| 5,873,009 A | 2/1999 | Yamashita | |
| 5,936,743 A | 8/1999 | Satoh | |
| 6,072,599 A | 6/2000 | Oba et al. | |

FOREIGN PATENT DOCUMENTS

| | | |
|---|---|---|
| JP | 241073 | 2/1990 |
| JP | 4172753 | 6/1992 |
| JP | 4312064 | 11/1992 |
| JP | 5276296 | 10/1993 |
| JP | 6177995 | 6/1994 |

* cited by examiner

Primary Examiner—Mark Wallerson
(74) Attorney, Agent, or Firm—Cooper & Dunham LLP

(57) ABSTRACT

A communication terminal apparatus (12) and a computer apparatus (14) are provided which enable systematic arrangement of information with respect to operations such as communication management information of a communication terminal apparatus and saving of recording paper. Report data is accumulated in accordance with information with respect to operations of the apparatus. When a request for sending a report is sent from the computer apparatus (14) via an interface (13), the accumulated report data is sent to the computer apparatus via the interface (13).

6 Claims, 26 Drawing Sheets

FIG. 7A

| REPORT OUTPUT REQUEST | TYPE VALUE OF OUTPUT REQUEST REPORT |
|---|---|

FIG. 7B

| TYPE VALUE ($Vr$) | TYPE OF OUTPUT REQUEST REPORT |
|---|---|
| 1 | COMMUNICATION MANAGEMENT REPORT |
| 2 | USER PARAMETER LIST |
| 3 | ONE-TOUCH DIAL REGISTRATION LIST |
| 4 | PROGRAM REGISTRATION LIST |
| 5 | FILE LIST |

FIG. 8

COMMUNICATION MANAGEMENT PROCESS — 205

START

301 — ADDITIONALLY STORE COMMUNICATION MANAGEMENT INFORMATION WITH RESPECT TO FACSIMILE TRANSMISSION OR RECEPTION PERFORMED IMMEDIATELY BEFORE

302 — INCREMENT NUMBER OF STORED COMMUNICATION MANAGEMENT INFORMATION

303 — CHECK NUMBER OF STORED COMMUNICATION MANAGEMENT INFORMATION

304 — DOES NUMBER OF STORED INFORMATION COINCIDE WITH MAXIMUM NUMBER?

YES → 305 — SUBSTITUTE OUTPUT REQUEST REPORT TYPE VALUE (1) FOR VARIABLE $V_r$

FREQ ← 0

A — 306

NO → END

FIG. 22

**\*\*\*COMMUNICATION MANAGEMENT REPORT\*\*\***

<TRANSMISSION>

| DATE | TIME | NAME | MODE | TIME | PAGE | RESULT | FILE |
|---|---|---|---|---|---|---|---|
| 4/10 | 11:44 | YOKOHAMA BRANCH | G3 TRANSMISSION ESM | 0:24 | 1 PIECE | OK | 0183 |
| | 11:58 | SAPPORO BRANCH | G3 TRANSMISSION DM | 1:32 | 4 PIECES | OK | 0184 |
| | 12:17 | OHMORI OFFICE | G3 TRANSMISSION FM | 1:54 | 5 PIECES | NG | 0186 |

<RECEPTION>

| DATE | TIME | NAME | MODE | TIME | PAGE | RESULT | FILE |
|---|---|---|---|---|---|---|---|
| 4/10 | 12:14 | HIROSHIMA BRANCH | G3 RECEPTION SM | 0:42 | 2 PIECES | OK | 0185 |
| | 13:17 | 0312345678 | G3 RECEPTION DM | 0:34 | 1 PIECE | OK | 0187 |
| | 14:45 | NAGANO BRANCH | G3 RECEPTION ESM | 0:52 | 1 PIECE | OK | 0188 |

FIG. 23

*USER PARAMETER LIST*

| | | | |
|---|---|---|---|
| AUTOMATIC INTENSITY | *ON | OFF | |
| LINE DENSITY (CHARACTER SIZE) | *NORMAL LETTER (S) | SMALL LETTER (D) | FINE LETTER (F) |
| TRANSMISSION MODE | DIRECT TRANSMISSION | *MEMORY TRANSMISSION | |
| RECEPTION TIME PRINT | ON | *OFF | |

FIG. 24

*ONE-TOUCH DIAL REGISTRATION LIST*

| NO. | NAME | TELEPHONE NUMBER |
|-----|------|------------------|
| 01 | SHINJUKU OFFICE | 0398765432 |
| 02 | SAITAMA FACTORY | 0123456789 |
| 03 | CENTRAL LABORATORY | 1239876543 |
| 04 | YOKOHAMA BRANCH | 3344455555 |
| 05 | PROGRAM REGISTRATION | |

FIG. 25

*PROGRAM REGISTRATION LIST*

| NO. | PROCESS MODE | OPTION | NAME |
|-----|--------------|--------|------|
| 05 | MEMORY TRANSMISSION | TIME SET 16:00 | TOKYO BRANCH |
| | | | OSAKA BRANCH |
| | | | FUKUOKA BRANCH |

FIG. 26

*FILE LIST*

| FILE | RECEPTION TIME | MODE | OPTION | NAME | RESULT |
|------|----------------|------|--------|------|--------|
| 0074 | 10:10 | MEMORY TRANSMISSION | TIME SET 16:00 | TOKYO BRANCH | OK |
| | | | | OSAKA BRANCH | WAITING |
| | | | | FUKUOKA BRANCH | WAITING |

COMMUNICATION TERMINAL APPARATUS AND COMPUTER APPARATUS

This is a continuation of application Ser. No. 08/983,609 filed Apr. 27, 1998 now U.S. Pat. No. 6,452,688 which was a filling under 35 U.S.C. §371 of International Application No. PCT/JP97/01509 having an International filing date of May 1, 1997.

TECHNICAL FIELD

The present invention relates to a communication terminal apparatus such as a facsimile apparatus and a data communication modem which exchanges communication data with a remote terminal and exchanges data with a computer apparatus connected via an interface, and also relates to a computer apparatus which can exchange data with a communication terminal connected via an interface.

BACKGROUND ART

In a conventional communication terminal such as a facsimile apparatus, communication is preformed with a computer apparatus such as a personal computer via an interface such as a Centronics interface. For example, image data received from a remote facsimile apparatus via a communication line is transferred to a personal computer so as to visually output the image data by displaying on a display apparatus or printing on the personal computer side. The received image data may be recorded as a file on a hard disc or processed by an optical character reader application so as to extract text data. Additionally, the image data may be transferred from an application on the personal computer to a facsimile apparatus so that the image data transferred from the personal computer is sent to a remote facsimile apparatus.

In the conventional communication terminal such as a facsimile apparatus, information with respect to operations of the apparatus is announced to a user by a visual output such as a display of a report based on the information with respect to operations of the apparatus or a record of the information on a recording paper by a plotter.

Specifically, the apparatus announces contents of various settings of the apparatus to a user. For example, a report is prepared based on contents of settings of the apparatus, and the report is visually output in accordance with a report output requesting operation of the user. As for the contents of settings to be displayed, there is a setting state for correspondence between each one-touch key and a name and a telephone number of a remote party in a one-touch dial function; a setting state for correspondence between each shortened number and a name and a telephone number of a remote party in a shortened number dial function; a setting state for a programmable function to register a procedure (a designation of transmitting time) for a transmitting operation for a predetermined address to a specific one-touch key; and a setting state of parameters of a predetermined value such as an original document reading line density or an image recording intensity which cannot be fixed at the time of delivery as the setting varies for each user.

Additionally, as for the information related to an operation of the apparatus, information (communication management information) with respect to communication with a remote terminal other than settings for the apparatus is included.

Japanese Laid-Open Patent Application No.4-172753 discloses a technique for accumulating and storing information (communication management information) with respect to communication in order to manage communication with a remote facsimile apparatus. As the communication management information, for example, there is information with respect to date (and time) of transmission and reception; information with respect to a facsimile number and a name of a remote facsimile apparatus, which are announced by the remote facsimile apparatus in a protocol procedure of a facsimile communication; information with respect to distinction as to whether a communication mode is G3 or G4; information with respect to resolution of received image information; information with respect to communication time; information with respect to the number of pages included in transmitted and received image information; information with respect to distinction as to whether a result of the transmission is normal or abnormal; and information with respect to communication cost.

If the communication management information is accumulated for a predetermined number of communications or if a user requests an output of the communication management information, the communication management information which is stored as internal expression codes such as a value "1" for the result indicating normal and a value "0" for the result indicating abnormal is converted into a character code, that is, for example, the value "1" when the result of transmission is normal is listed in accordance with a predetermined format by converting the value "1" into a character code (79, 75) which corresponds to a character string "OK". Thereafter a string of character codes corresponding to the information management report is prepared. Additionally, for example, font data corresponding to the character string "OK" is read so as to develop the image of the character string "OK" on a memory in order to prepare image data of the communication management report. The image data thus prepared is output by being displayed on a display unit or recorded on a recording paper.

As mentioned above, in the conventional communication terminal such as a facsimile apparatus, a communication report is produced and output on recording paper so as to manage communications with a remote communication terminal. Accordingly, if there are many communications, the communication management report is recorded and output frequently. Thus, large amounts of recording paper is used to output the communication management report. Additionally, when the large amounts of communication management reports is output by being recorded on recording paper, there is a problem in that such management is very inconvenient when the user manages the communications of the communication terminal for each period of time, such as on a monthly basis.

Additionally, when the communication management report is displayed on a display unit, a display area of the display unit must be enlarged so as to display the communication management information in the form of a list such as a record on recording paper. Accordingly, the capacity of an image memory must be increased. If the display area is small, the capacity of the image memory can be decreased, however, an operability is decreased since the communication management report must be displayed one by one. Additionally, the communication management report displayed on the display unit is used only for a visual check and cannot be used for other purposes.

As mentioned above, as long as the communication terminal outputs the communication management report by recording on recording paper in the terminal or displaying it on a display unit, there is a problem in that the user cannot perform a systematic management of the communication management report of the communication terminal. Additionally, there is a problem that recording paper is wasted. Further, the same kind of problem occurs with respect to various information related to an operation of the apparatus including contents of the setting of the apparatus other than the communication management information.

DISCLOSURE OF THE INVENTION

It is an object of the present invention to provide an improved and useful communication terminal apparatus and a computer apparatus in which the above-mentioned problems are eliminated.

A more specific object of the present invention is to provide a communication terminal apparatus and a computer apparatus in which information related to an operation of the communication terminal apparatus such as communication management information can be managed easily and systematically.

Another object of the present invention is to provide a communication terminal apparatus and a computer apparatus which can reduce the amount of recording paper.

In order to achieve the above-mentioned objects, there is provided according to one aspect of the present invention a communication terminal apparatus which exchanges communication data with a remote communication terminal apparatus via a communication line and also is capable of exchanging data with a computer apparatus connected via an interface, characterized by:

report accumulating means for accumulating report data which is based on information related to apparatus operations; and report sending means for sending the report data accumulated in said report accumulating means to said computer apparatus via said interface when a request for sending a report is sent from said computer apparatus via said interface.

According to the above-mentioned invention, since the report data which is based on the information with respect to apparatus operations accumulated in the report accumulating means is sent to said computer apparatus via the interface when a request for sending the report is sent from the computer apparatus via the interface, there is an effect that an easy and systematic arrangement of the report data which is based on the information with respect said apparatus operations can be achieved by filing by the computer apparatus. Additionally, there is an advantage that the number of recording papers for recording the report data based on the information with respect to the apparatus operations can be reduced by displaying the information with respect to the apparatus operations on the computer apparatus side.

Additionally, there is provided according to another aspect of the present invention a communication terminal apparatus which exchanges communication data with a remote communication terminal apparatus via a communication line and also is capable of exchanging data with a computer apparatus connected via a network, characterized by:

report accumulating means for accumulating report data which is based on information related to apparatus operations; and report sending means for sending the report data accumulated in said report accumulating means to said computer apparatus via said network when a request for sending a report is sent from said computer apparatus via said network.

According to this invention, since the report data which is based on the information with respect to apparatus operations accumulated in the report accumulating means is sent to said computer apparatus via the network when a request for sending the report is sent from the computer apparatus via the network, there is an effect that an easy and systematic arrangement of the report data which is based on the information with respect to said apparatus operations can be achieved by filing by the computer apparatus. Additionally, there is an advantage that the number of recording papers for recording the report data based on the information with respect to the apparatus operations can be reduced by displaying the information with respect to the apparatus operations on the computer apparatus side.

Additionally, there is provided according to another aspect of the present invention a communication terminal apparatus which exchanges communication data with a remote communication terminal apparatus via a communication line and also is capable of exchanging data with a computer apparatus connected via a network, characterized by:

report accumulating means for accumulating report data which is based on information related to apparatus operations; and report sending means for sending the report data accumulated in said report accumulating means to said computer apparatus via said network when an amount of information related to said apparatus operations accumulated in said report accumulating means reaches a predetermined amount.

According to the above-mentioned invention, since the report data which is based on the information with respect the apparatus operations accumulated in the report accumulating means is sent to the computer apparatus via the network when the amount of information with respect to the apparatus operations accumulated in the report accumulating means reaches a predetermined amount, there is an advantage that it is not happen that the report data based on the information with respect to the apparatus operations will not be erased without an announcement to a user even when the request for sending the report has not been issued from the computer apparatus for a long time.

There is provided according to yet another aspect of the present invention a communication terminal apparatus which exchanges communication data with a remote communication terminal apparatus via a communication line and also is capable of exchanging data with a computer apparatus connected via a network, characterized by:

report accumulating means for accumulating report data which is based on information related to apparatus operations; and report sending means for sending the report data accumulated in said report accumulating means to said computer apparatus via said network when a change is made in contents of the report data accumulated in said report accumulating means.

According to the above-mentioned invention, since the report data after being changed is sent to the host computer via the network when there is a change in the contents of the report data which is based on the information with respect to the apparatus operations accumulated in the report accumulating means, there is an advantage that the new contents of the report data after being changed, which is based on the information with respect to the apparatus operations, can be announced immediately to a user.

There is provided according to one aspect of the present invention a communication terminal apparatus which exchanges communication data with a remote communication terminal apparatus via a communication line and also is capable of exchanging data with a computer apparatus connected via an interface, characterized by:

report accumulating means for accumulating setting contents report data which is based on contents of an apparatus setting; and report sending means for sending the setting contents report data accumulated in said report accumulating means to said computer apparatus via said interface when a request for sending a setting contents report is sent from said computer apparatus via said interface.

According to the above-mentioned invention, since the report data which is based on the information with respect to contents of the setting of the apparatus accumulated in the report accumulating means is sent to the computer apparatus via the interface when a request for sending the report is sent from the computer apparatus via the interface, there is an effect that an easy and systematic arrangement of the setting contents report data can be achieved by filing by the computer apparatus. Additionally, there is an advantage that the number of recording papers for recording the setting contents report data can be reduced by displaying the setting contents report data on the computer apparatus side.

Additionally, there is provided according to another aspect of the present invention a communication terminal apparatus which exchanges communication data with a remote communication terminal apparatus via a communication line and also is capable of exchanging data with a computer apparatus connected via an interface, characterized by:

communication management information accumulating means for accumulatively storing information related to communications performed with the remote communication terminal apparatus as communication management information for each communication;

report producing means for producing communication management report data which is based on the communication management information of each communication accumulated in said communication management information accumulating means when a request for sending a communication management report is sent from said computer apparatus via said interface; and report sending means for sending the communication management report data produced by said report producing means to said computer apparatus via said interface.

According to the above-mentioned invention, since a communication management report which is based on the communication management information for each communication accumulated in the communication management information accumulating means is sent to the computer apparatus when a request for sending the communication management report is sent from the computer apparatus, many communication management reports are not recorded on a recording paper as is in a case in which the communication terminal apparatus outputs the communication management reports by itself when the number of reports is large, and thus management is not complicated. Additionally, since there is no need to continuously store the communication management information corresponding to the communication management report data which has been sent to the computer apparatus, there is an advantage that the communication terminal apparatus does not need a large capacity memory for storing the communication management information. Additionally, there is an effect that an easy and systematic arrangement of the communication management report data can be achieved by filing by the computer apparatus. Additionally, there is an advantage that the number of recording papers for recording the communication management report data can be reduced by displaying the communication management report on the computer apparatus side.

Additionally, there is provided according to the present invention a communication terminal apparatus which exchanges communication data with a remote communication terminal apparatus via a communication line and also is capable of exchanging data with a computer apparatus connected via an interface, characterized by:

communication management information accumulating means for accumulatively storing information related to communications performed with the remote communication terminal apparatus as communication management information for each communication;

report producing means for producing communication management report data which is based on the communication management information of each communication accumulated in said communication management information accumulating means when an amount of communication management information for each communication accumulated in said communication management information accumulating means reaches a predetermined number; and report sending means for sending the communication management report data produced by said report producing means to said computer apparatus via said interface.

According to the above-mentioned invention, since the communication management report data which is based on the communication management information for each communication is automatically sent to the computer apparatus when the number of communication management information for each communication which are accumulated in the communication management information accumulating means reaches a predetermined number, there is an advantage that the communication management information is not canceled without announcement to a user even when a request for sending the communication management report is not issued from the computer apparatus for a long time.

There is provided according to another aspect of the present invention a communication terminal apparatus which exchanges communication data with a remote communication terminal apparatus via a communication line and also is capable of exchanging data with a computer apparatus connected via an interface, characterized by:

communication management information accumulating means for accumulatively storing information related to communications performed with the remote communication terminal apparatus as communication management information for each communication;

report sending instruction inputting means for receiving an input operation for instructing a transmission of communication management report data to said computer apparatus;

report producing means for producing the communication management report data which is based on the communication management information of each communication accumulated in said communication management information accumulating means when an instruction for sending a report is input from said report sending instruction inputting means; and report sending means for sending the communication management report data produced by said report producing means to said computer apparatus via said interface.

According to the above-mentioned invention, since the communication management report data which is based on the communication management information for each communication accumulated in the communication management accumulating means is sent to the computer apparatus when an instruction for sending the report is input by the report sending instruction inputting means, there is an advantage that the communication management report data can be sent to the computer apparatus whenever a user desires.

Additionally, the communication terminal apparatus according to the present invention may comprise transmission unable report outputting means for sending to said computer apparatus a notification for confirming whether or not preparation of reception of the report data has been completed before said report sending means sends the report data to said computer apparatus, and for visually outputting said report data when a response acknowledgement indicating completion of the preparation of reception of the report data has not been sent from said computer apparatus within a predetermined time period after sending the notification.

According to the above-mentioned invention, since a notification for confirming whether or not preparation of reception of the report data has been completed is sent to the computer apparatus before the report sending means sends the report data to the computer apparatus, and the report data is visually output by the transmission unable report outputting means when a response acknowledgement indicating a completion of the preparation of reception of the report data has not been sent from the computer apparatus within a predetermined time period after sending the notification, the report data is self-output by the communication terminal apparatus when power of the computer apparatus is in an off state and thus the computer apparatus cannot receive the report data from the communication terminal apparatus in a normal condition. Thus, for example, if there are communications which exceed the predetermined number of times in the night time, the communication management information corresponding to the communications can be prevented from being erased without being able to announce it to a user.

Additionally, the communication terminal apparatus according to the present invention may comprise:

report output destination setting means for setting whether said report data is sent to said computer apparatus or visually output by the apparatus itself; and report outputting means for visually outputting said report data when a setting of said report output destination setting means is for visually outputting said report data by the apparatus itself, wherein said report sending means sends said report data to said computer apparatus only when the setting of said report output setting means is for sending said report data to said computer apparatus.

Accordingly, since it can be set either to send the report data to the computer apparatus or to be visually output by the apparatus itself, the report data can be self output by the communication terminal apparatus itself without sending the report data to the computer apparatus and there is an effect that operability for the user can be improved.

Additionally, in the communication terminal apparatus according to the present invention, the report accumulating means may accumulate the report data sent from the report sending means to the computer apparatus as image data.

According to this invention, since the report accumulating means accumulates the report data sent from the report sending means to the computer apparatus as image data, the report data received by the computer apparatus can be converted into a text file by conventional OCR software, which enables an arbitrary arrangement. Additionally, since the report data sent to the computer apparatus is the same type as that of the report data which is self-output, there is an advantage that there is no need to provide a new structure or control function to the computer apparatus for responding to data of a different type when it is compared with a case in which the report data is sent to the computer apparatus in a type different from the type of image data.

Additionally, in the communication terminal apparatus according to the present invention the report accumulating means may accumulate the report data sent from the report sending means to the computer apparatus as image data which is encoded by a predetermined encoding method.

Accordingly, since the report accumulating means accumulates the report data sent from the report sending means to the computer apparatus as image data which is encoded by a predetermined encoding method, there is an advantage that the amount of data sent to the computer apparatus can be reduced further than image data which is not encoded and a transmission time for the report data can be reduced by the corresponding amount of time.

Additionally, in the communication terminal apparatus according to the present invention, the report accumulating means may accumulate the report data sent from the report sending means to the computer apparatus as character code data.

According to this invention, since the report accumulating means accumulates the report data sent from the report sending means to the computer apparatus as character code data, there is an advantage that the amount of data sent to the computer apparatus can be reduced further than image data which is encoded or not encoded and a transmission time for the report data can be further reduced by the corresponding amount of time.

Additionally, in the communication terminal apparatus according to the present invention, the report accumulating means may accumulate the report data sent from the report sending means to the computer apparatus as internal expression code data in a predetermined form.

According to this invention, since the report accumulating means accumulates the report data sent from the report sending means to the computer apparatus as internal expression code data in a predetermined form, there is an advantage that the amount of data sent to the computer apparatus can be reduced further than character code data and a transmission time for the report data can be further reduced by the corresponding amount of time.

Additionally, in the communication terminal apparatus according to the present invention, the report producing means may produce the report data sent from the report sending means to the computer apparatus as image data.

Accordingly, since the report producing means produces the report data sent from the report sending means to the computer apparatus as image data, the report data received by the computer apparatus can be converted into a text file by conventional OCR software, which enables an arbitrary arrangement. Additionally, since the report data sent to the computer apparatus is the same type as that of the report data which is self-output, there is an advantage that there is no need to provide a new structure or control function to the computer apparatus for responding to data of a different type when it is compared with a case in which the report data is sent to the computer apparatus in a type different from the type of image data.

Additionally, in the communication terminal apparatus according to the present invention, the report producing means may produce the report data sent from the report sending means to the computer apparatus as image data which is encoded by a predetermined encoding method.

Accordingly, since the report producing means produces the report data sent from the report sending means to the computer apparatus as image data which is encoded by a predetermined encoding method, there is an advantage that the amount of data sent to the computer apparatus can be reduced further than image data which is not encoded and a transmission time for the report data can be reduced by the corresponding amount of time.

Additionally, in the communication terminal apparatus according to the present invention, the report producing means may produce the report data sent from the report sending means to the computer apparatus as character code data.

Accordingly, since the report producing means produces the report data sent from the report sending means to said computer apparatus as character code data, there is an advantage that the amount of data sent to the computer apparatus can be reduced further than image data which is encoded or not encoded and a transmission time for the report data can be further reduced by the corresponding amount of time.

Additionally, in the communication terminal apparatus according to the present invention, the report producing means may produce the report data sent from the report sending means to the computer apparatus as internal expression code data in a predetermined form.

Accordingly, since the report producing means produces the report data sent from the report sending means to the computer apparatus as internal expression code data in a predetermined form, there is an advantage that the amount of data sent to the computer apparatus can be reduced further than character code data and a transmission time for the report data can be further reduced by the corresponding amount of time.

Additionally, there is provided according to another aspect of the present invention a computer apparatus which is capable of exchanging data with a communication terminal apparatus connected via an interface, characterized by:

transmission requesting means for requesting a transmission of a report to said communication terminal apparatus via said interface;

report receiving means for receiving report data which is sent from said communication terminal apparatus via said interface as image data in accordance with a request for sending a report from said transmission requesting means; and report outputting means for visually outputting the report data as the image data received by said report receiving means.

According to the above-mentioned invention, since the request for sending a report is sent to the communication terminal apparatus via the interface and the report data as image data sent from the communication terminal apparatus in response to the request for sending a report is received via the interface and is visually output, there is an effect that there is no need to record the report data on a recording paper on the communication terminal apparatus side, and the amount of recording paper can be saved. Additionally, there is an advantage that the report data can be visually output without any process applied to the report data by receiving the report data as image data.

Additionally, there is provided according to another aspect of the present invention a computer apparatus which is capable of exchanging data with a communication terminal apparatus connected via an interface, characterized by:

transmission requesting means for requesting a transmission of a report to said communication terminal apparatus via said interface;

report receiving means for receiving report data which is sent from said communication terminal apparatus via said interface as image data encoded by a predetermined encoding method in accordance with a request for sending a report from said transmission requesting means;

report data decoding means for decoding the report data, which is the image data received by said report receiving means and encoded by said predetermined encoding method, by a predetermined decoding method corresponding to said predetermined encoding method; and report outputting means for visually outputting the report data as the image data decoded by said report data decoding means.

According to the above-mentioned invention, since the request for sending a report is sent to the communication terminal apparatus via the interface and the report data as encoded image data sent from the communication terminal apparatus in response to the request for sending a report is received via the interface and is visually output after it is decoded, there is an effect that there is no need to record the report data on a recording paper on the communication terminal apparatus side, and the amount of recording paper can be saved. Additionally, since the report data is received as encoded image data, there is an advantage that transmission time of the report data can be reduced by an amount of time corresponding to the reduced amount of data due to encoding when it is compared with a case in which non-encoded image data is received as it is.

Additionally, there is provided according to another aspect of the present invention a computer apparatus which is capable of exchanging data with a communication terminal apparatus connected via an interface, characterized by:

transmission requesting means for requesting a transmission of a report to said communication terminal apparatus via said interface;

report receiving means for receiving report data which is sent from said communication terminal apparatus via said interface as character code data in accordance with a request for sending a report from said transmission requesting means;

font developing means for font-developing the report data, which is the character code data received by said report receiving means, so as to convert the character code data into image data; and report outputting means for visually outputting the report data as the image data font-developed by said font developing means.

According to the above-mentioned invention, since the request for sending a report is sent to the communication terminal apparatus via the interface and the report data as character code data sent from the communication terminal apparatus in response to the request for sending a report is received via the interface and is visually output after it is font-developed, there is an effect that there is no need to record the report data on a recording paper on the communication terminal apparatus side, and the amount of recording paper can be saved. Additionally, since the report data is received as character code data, there is an advantage that a transmission time of the report data can be reduced by an amount of time corresponding to the reduced amount of data due to the reception of character data as it is when it is compared with a case in which non-encoded image data or encoded image data is received as it is.

Other objects, features and advantages of the present invention will become more apparent from the following detailed description when read in conjunction with the accompanying drawings.

BRIEF DESCRIPTION OF THE DRAWINGS

FIG. 7A is an illustration showing a format of report output requesting data.

FIG. 7B is an illustration showing correspondence between types of reports and values of the types.

FIG. 8 is a flowchart for indicating a procedure of a communication management process in the facsimile apparatus according to the embodiment of the present invention.

FIG. 22 is an illustration of an example of a display output of a communication management report.

FIG. 23 is an illustration of an example of a record output of a user parameter list.

FIG. 24 is an illustration of an example of a record output of a one-touch dial registration list.

FIG. 25 is an illustration of an example of a record output of a program registration list.

FIG. 26 is an illustration of an example of a record output of a file list.

BEST MODE FOR CARRYING OUT THE INVENTION

A description will now be given, with reference to the accompanying drawings, of an embodiment of the present invention.

Figure 1:
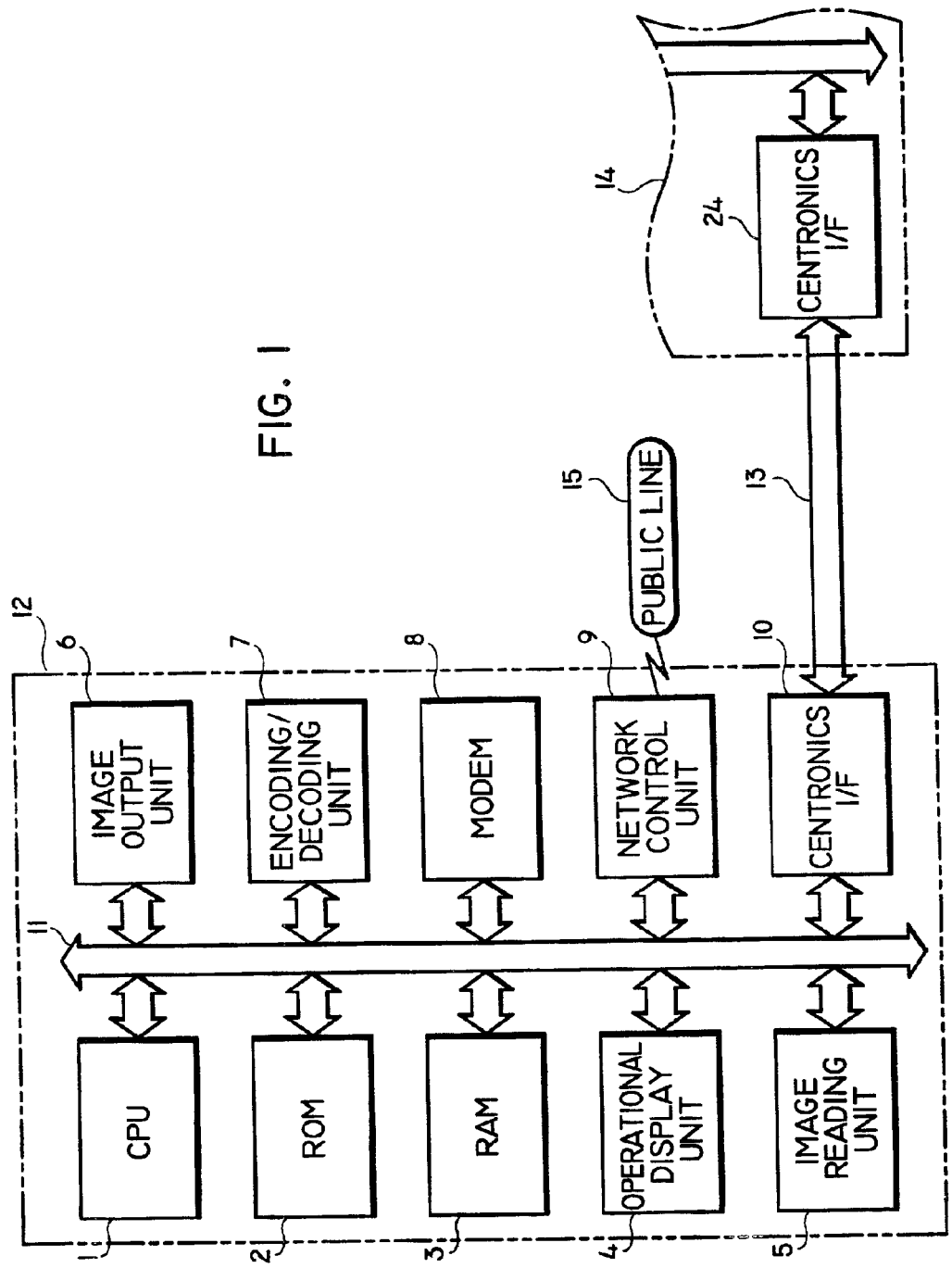
FIG. 1 is a block diagram of a facsimile apparatus according to an embodiment of the present invention.

FIG. 1 is a block diagram of a facsimile apparatus as a communication terminal according to an embodiment of the present invention.

In the figure, the facsimile apparatus 12 according to the embodiment of the present invention comprises a CPU 1, a ROM 2, a RAM 3, an operational display unit 4, an image reading unit 5, a image outputting unit 6, an encoding/decoding unit 7, a modem 8, a network control unit 9, a Centronics I/F 10 and a data bus 11. The CPU 1 controls the operational display unit 4, the image reading unit 5, the image outputting unit 6, the encoding/decoding unit 7, the modem 8, the network control unit 9, the Centronics I/F 10 and the data bus 11 by using the RAM 3 as a working area in accordance with control programs written in the ROM 2.

The ROM 2 is a read only memory in which the control programs used by the CPU 1 for controlling the above-mentioned units are stored as mentioned above. Additionally, a correspondence table of character codes and font data is previously stored in the ROM 2 for producing image data of various reports described later. The RAM 3 is a random access memory which is used as a working area of the CPU 1 as mentioned above, and temporarily stores image data read by the image reading unit 5 as a file for a memory transmission or temporarily stores received image data as a file until the image data is recorded by the image outputting unit 6. Additionally, the RAM 3 is also used for storing information related to an operation of the apparatus such as communication management information.

The operational display unit 4 comprises a ten-key input for designating a facsimile number, a transmission start key, a one-touch dial key and various setting keys, and also comprises a display such as a liquid crystal display device so as to display a state of the apparatus to be announced to the user or various messages.

The image reading unit 5 reads the original image by a scanning line density set to one of line densities 3.85 lines/mm (standard), 7.7 lines/mm (detail) and 15.4 lines/mm (fine) so as to obtain image data. The image outputting unit 6 outputs the received image data in accordance with the corresponding line density, and records as an output (copy operation) the image data read by the image reading unit 5 in accordance with the corresponding line density. The image outputting unit 6 may output image data of various reports described later.

The encoding/decoding unit 7 encodes and compresses image data to be transmitted by a predetermined encoding method which complies with a G3 facsimile communication such as an MH encoding method or an MR encoding method, and decodes and expands received image data by a predetermined decoding method corresponding to the MH encoding method or the MR encoding method. The modem 8 is a G3 facsimile modem which modulates data to be transmitted and demodulates received data. The network control unit 9 is connected to a public line 15 so as to perform a closing or releasing of a direct current loop of a line, detection of a polarity reversal of a line, detection of a release of a line, detection of a transmission sound, a connection control such as detection of a calling signal and generation of a dial pulse.

The Centronics I/F 10 is paired with a Centronics I/F 24 of a computer apparatus 14 described later so as to form an interface 13 through which the facsimile apparatus 1 and the personal computer 14 can exchange data. The system bus 11 is a signal line through which the above-mentioned units exchange data.

Figure 2:
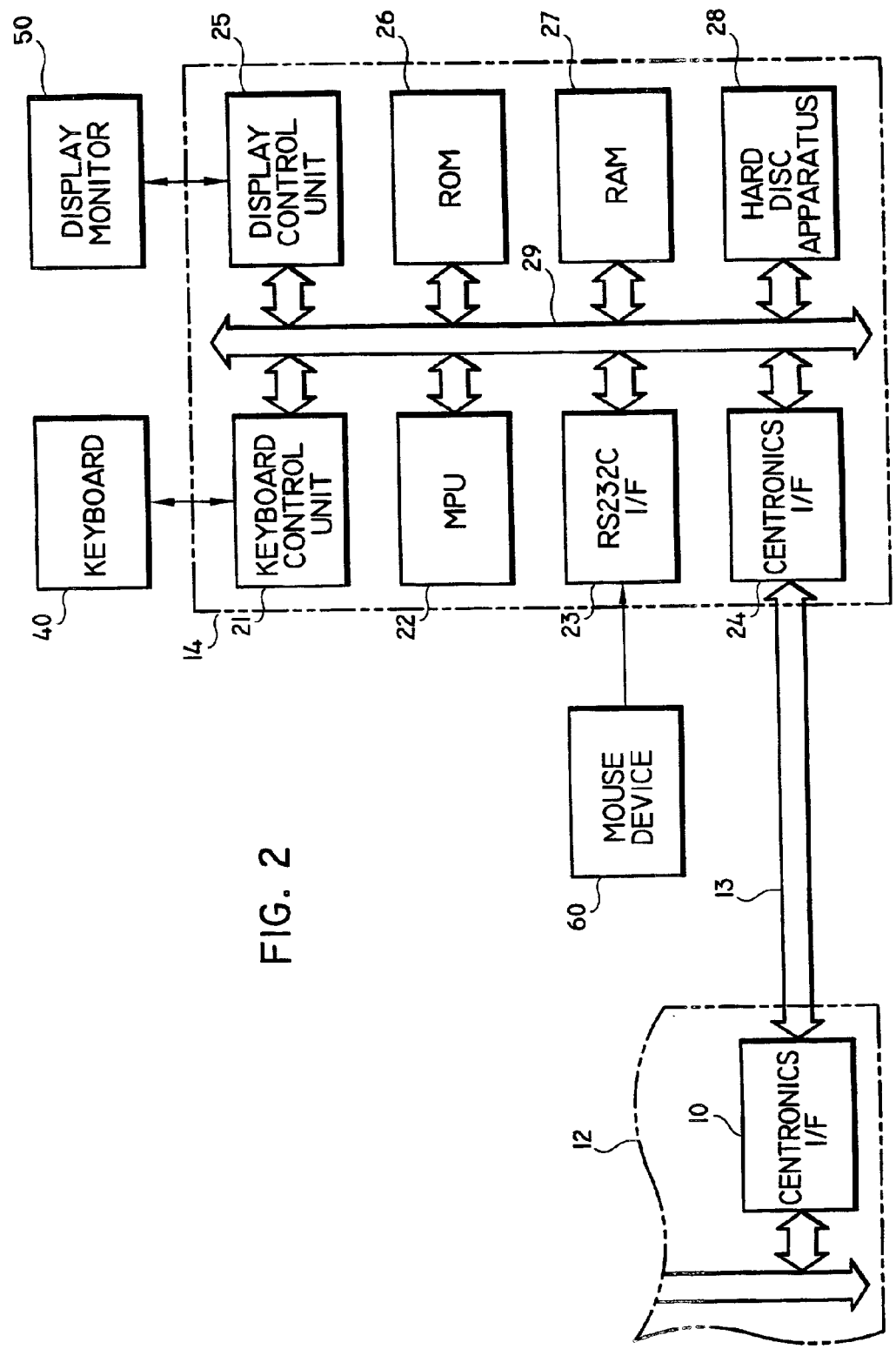
FIG. 2 is a block diagram of a computer apparatus according to an embodiment of the present invention.

FIG. 2 is a block diagram of a computer apparatus according to an embodiment of the present invention.

In the figure, the computer apparatus 14 comprises a keyboard control unit 21, an MPU 22, an RS-232C interface 23, a Centronics I/F 24, a display control unit 25, a ROM 26, a RAM 27, a hard disc apparatus 28 and a system bus 29. The computer apparatus 14 further comprises, as peripheral devices, a keyboard 40, a display monitor 50 and a mouse device 60 as a pointing device.

The keyboard control unit 21 controls an operation for interpreting key operations performed on the keyboard 40 and announcing the interpretation to the MPU 22. The MPU 22 is a microprocessor for controlling each unit of the apparatus. The RS-232C interface 23 is provided for receiving information output from the mouse device 60 which information corresponds to a movement of the mouse device 60 and information with respect to whether or not a button is pressed, and sending the information to the MPU 22.

The Centronics I/F 24 is paired with the Centronics I/F 10 of the facsimile apparatus 12 so as to form the interface 13 through which the facsimile apparatus 1 and the personal computer 14 can exchange data.

The display control unit 25 generates an image signal to be sent to a display monitor 50 in accordance with an instruction from the MPU 22. The display monitor 50 visually displays the image signal from the display control unit 25. The ROM 26 is a read only memory in which a program for performing a control procedure of the MPU 22 is stored. The RAM 27 is a random access memory used as a working area of the MPU 22. The hard disc apparatus 28 stores a program for performing a control procedure of the MPU 22 and various kinds of data as files. The hard disc apparatus 28 stores a correspondence table between the character codes and font data as a font file so as to display characters on the display monitor 50. The system bus 29 is a signal line through which the above-mentioned units exchange data.

Figure 3:
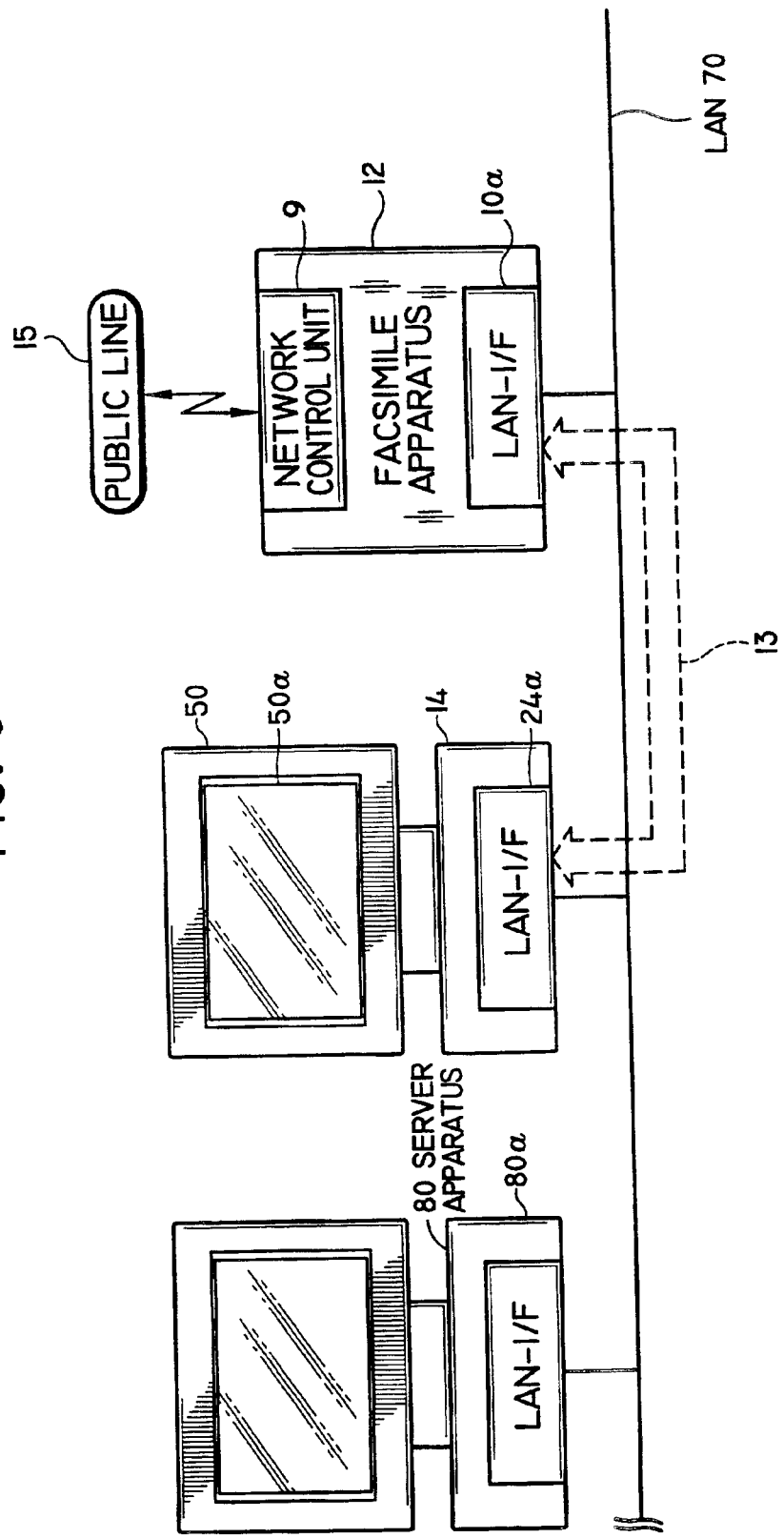
FIG. 3 is an illustration showing the computer apparatus and the facsimile apparatus according to the embodiment of the present invention which are interconnected via a LAN.

The facsimile apparatus 12 and the computer apparatus 14 described above exchange data via the interface 13 formed by the pair of Centronics I/F 10 and the Centronics I/F 24 connected on a one to one basis. Another form of the connection for exchanging data is shown in FIG. 3.

In the figure, the facsimile apparatus 12 has the same construction with the facsimile apparatus 12 shown in FIG. 1 except for the Centronics I/F 10 being replaced with a LAN (local area network)-I/F 10a. Additionally, the computer apparatus 14 has the same construction as the computer apparatus 14 shown in FIG. 2 except for the Centronics I/F 24 being replaced with a LAN-I/F 24a.

The facsimile apparatus 12 and the computer apparatus 14 are connected to a LAN 70 via the LAN-I/F 10a and the LAN-I/F24a, respectively. The LAN 70 is connected to a server apparatus 80 via a LAN-I/F 80a in addition to the facsimile apparatus 12 and the computer apparatus 14, and many other terminals (not shown in the figure) are connected.

The facsimile apparatus 12 and the computer apparatus 14 exchange data through the LAN 70, and other terminals exchange data through the LAN 70. However, in a network such as a LAN or a WAN (wide area network), when data is sent from a sending terminal on the network to a destination terminal, the data is distinguished from other data by adding the sending terminal's own address as a sender address to data to be transmitted and adding a destination address of the receiving terminal on the network as a destination address to the data to be transmitted.

Accordingly, when the exchange of data between the facsimile apparatus 12 and the computer apparatus 14 via the LAN 70 is concerned, it is said that the interface 13 is virtually formed on the LAN 70. This is equivalent to the interface 13 formed by the Centronics I/Fs 10 and 24 shown in FIGS. 1 and 2.

Figure 4:
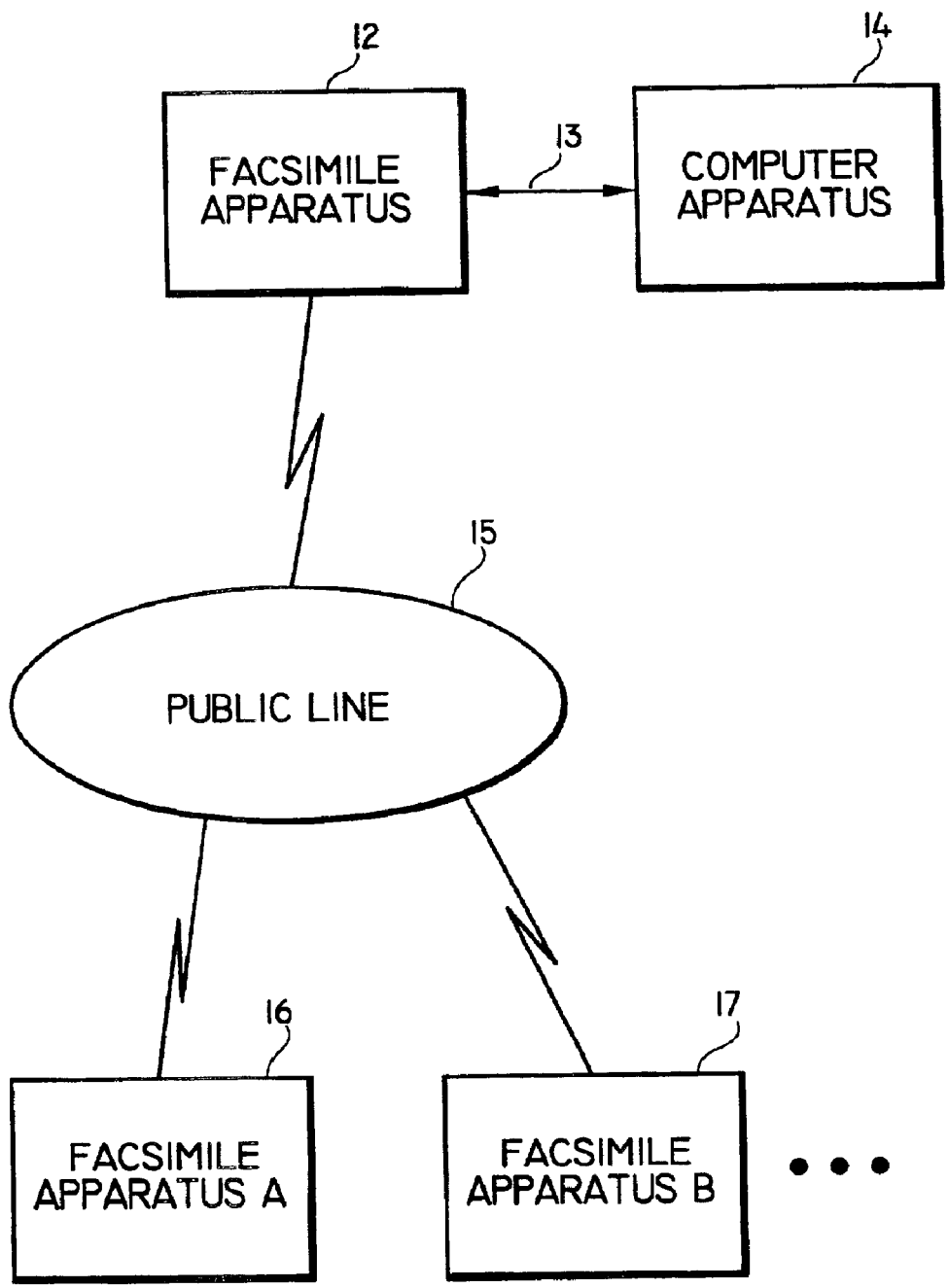
FIG. 4 is an illustration showing a computer apparatus and a facsimile apparatus according to an embodiment of the present invention which are interconnected via an interface and another facsimile apparatus connected to the facsimile apparatus via a public line.

FIG. 4 is an illustration of a state in which the facsimile apparatus 12 is connected to the computer apparatus 14 via the interface 13 which is formed by the Centronics I/Fs 10 and 24 as shown in FIGS. 1 and 2 or virtually formed on the LAN 70 as shown in FIG. 3, and also connected to other facsimile apparatuses such as a facsimile apparatus A and a facsimile apparatus B which are connected to the public line 15 by being connected to the public line 15 via the network control unit 9.

The facsimile apparatus 12 which is in a state of connection shown in FIG. 4 transmits/receives a facsimile message to/from other facsimile apparatuses such as the facsimile apparatuses A and B via the public line 15. Additionally, the facsimile apparatus 12 performs a transmission and reception of data such as a facsimile image with the computer 14 via the interface 13, and performs transmission of various report data according to the present invention described later.

A description will now be given sequentially of a procedure for transmitting various report data from facsimile apparatus 12 to the computer apparatus 14.

Figure 5:
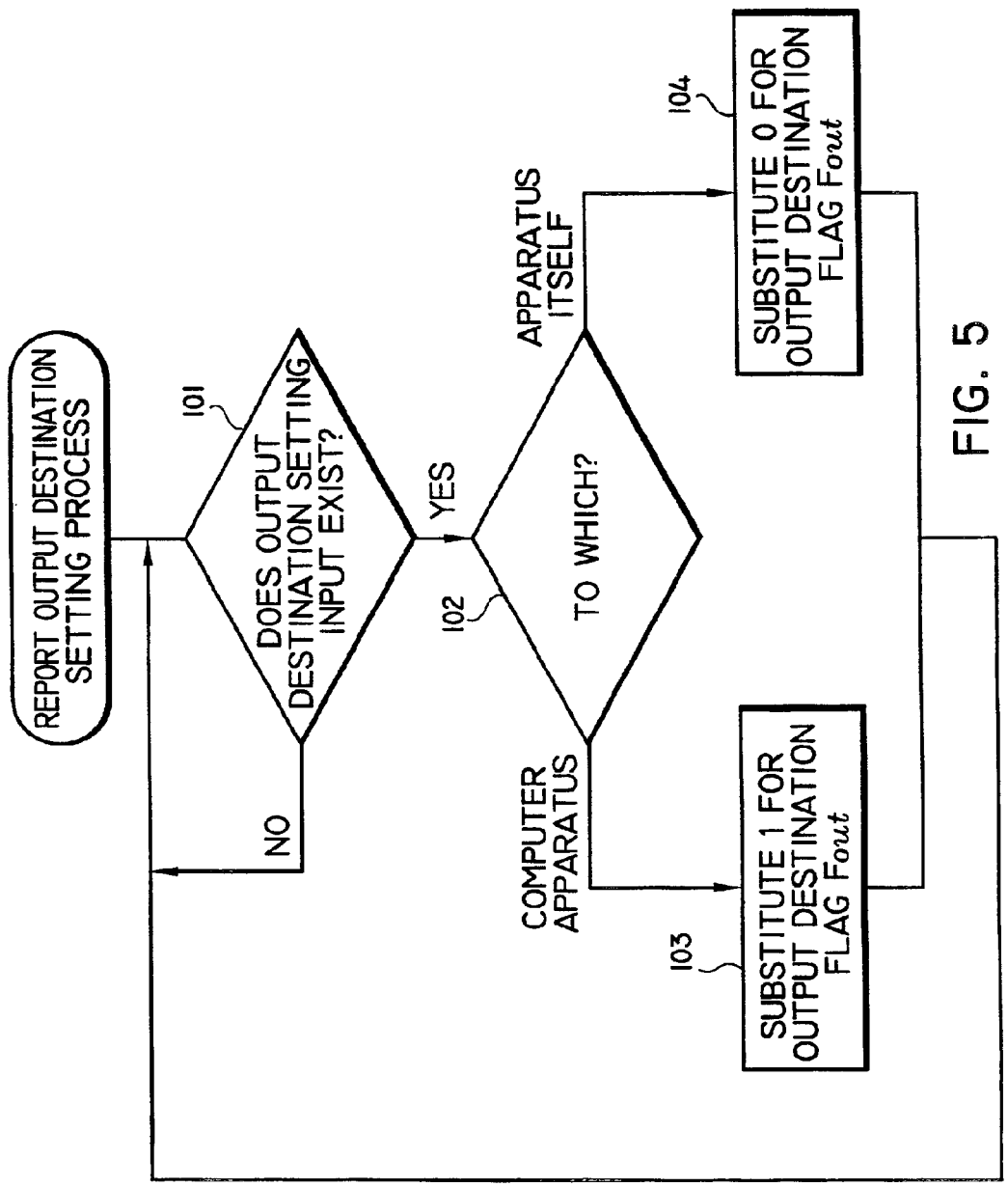
FIG. 5 is a flowchart indicating a procedure of a report output location setting process in the facsimile apparatus according to the embodiment of the present invention.

FIG. 5 is a flowchart indicating a procedure performed by the facsimile apparatus 12 for determining whether various reports are output as a record by the image output unit 6 or output (sent) to the computer 14.

In the figure, the CPU 1 monitors whether an input for setting a report output destination is performed (No loop of determination 101). The setting of the report output destination is performed by the facsimile apparatus 12 or by the computer apparatus 14 via the interface 13. If the setting is performed by the facsimile apparatus 12, for example, a report output destination key is provided to the operational display unit 4 so that the setting is performed based on whether a key corresponding to a setting of the computer apparatus 14 to be the output destination or a key corresponding to a setting of the apparatus 12 to be the output destination is pressed. When the setting is performed by the computer apparatus 14 via the interface 13, the MPU 22 sends setting information to the CPU 1 of the facsimile apparatus 12 via the interface 13, the setting information indicating the output destination of a report selected by an input operation through the keyboard 40 by a user or by a click operation of the mouse device 60 on an icon displayed on the display monitor 50.

If it is determined that the setting of the output destination is performed in the determination 101 (Yes of determination 101), it is determined whether the output destination is the computer apparatus 14 or the apparatus 12 (determination 102). If the output destination is the computer apparatus 14, "1" is substituted for an output destination flag Fout (Flagout). If the output destination is apparatus 12, "0" is substituted for the output destination flag Fout (process 104).

The output destination of the report is recorded as a value of the output destination flag Fout by the above mentioned process, and is referred to in other processes described later. It should be noted that the report output destination setting process shown in FIG. 5 is always performed so that the output destination desired by the user can be changed at any time. Thereby, the output destination of the report can be freely selected in accordance with the user's preference even when the report can be output (sent) to the computer apparatus 14, and thus it is convenient for a user.

A description will now be given, with reference to FIG. 6, of a procedure of a process in a waiting state which is performed in the facsimile apparatus 12. It should be noted that, in the flowchart shown in FIG. 6, a detailed description of a transmission and reception procedure of facsimile messages based on the G3 facsimile protocol is omitted since nothing differs from a conventional procedure.

In the figure, the CPU 1 checks whether or not a facsimile transmission is started due to a transmission input operation by a user through the operational display unit 4 (determination 201). If it is started (Yes of determination 201), a facsimile transmission is performed (process 202), and a communication management process described later (process 205) is performed.

If a facsimile transmission is not started in the determination 201 (No of determination 201), a check is made whether or not a facsimile reception has started due to reception from other facsimile apparatuses via the public line 15 (determination 203). If it is started (Yes of determination 203), a facsimile reception is performed (process 204), and a communication management process is performed (process 205).

If the facsimile reception has not started in the determination 203 (No of determination 203), a check is made whether or not a report output request has been sent via the interface 13 (determination 206). If a report output request has been sent (Yes of determination 206), a value of an output request report type which is sent together with the report output request is substituted for a variable Vr (process 207).

FIG. 7A shows a format of data transmitted from the computer apparatus 14 to the facsimile apparatus 12 via the interface 13 so as to request an output of a report. In FIG. 7A, the data for requesting an output of a report comprises a part which indicates that the data is for requesting an output of a report and a part which indicates a value of an output request of a report type which specifies a type of report for which an output is requested.

FIG. 7B shows specific types of reports corresponding to each value of the report for which the output is requested. A type value "1" indicates "communication management report"; a type value "2" indicates "user parameter list"; a type value "3" indicates "one-touch dial registration list"; a type value "4" indicates "program registration list"; and a type value 5 indicates "file list". Since these values are substituted for the variable Vr, a type of the report for which the output is requested can be known by the value of the variable Vr.

Figure 6:
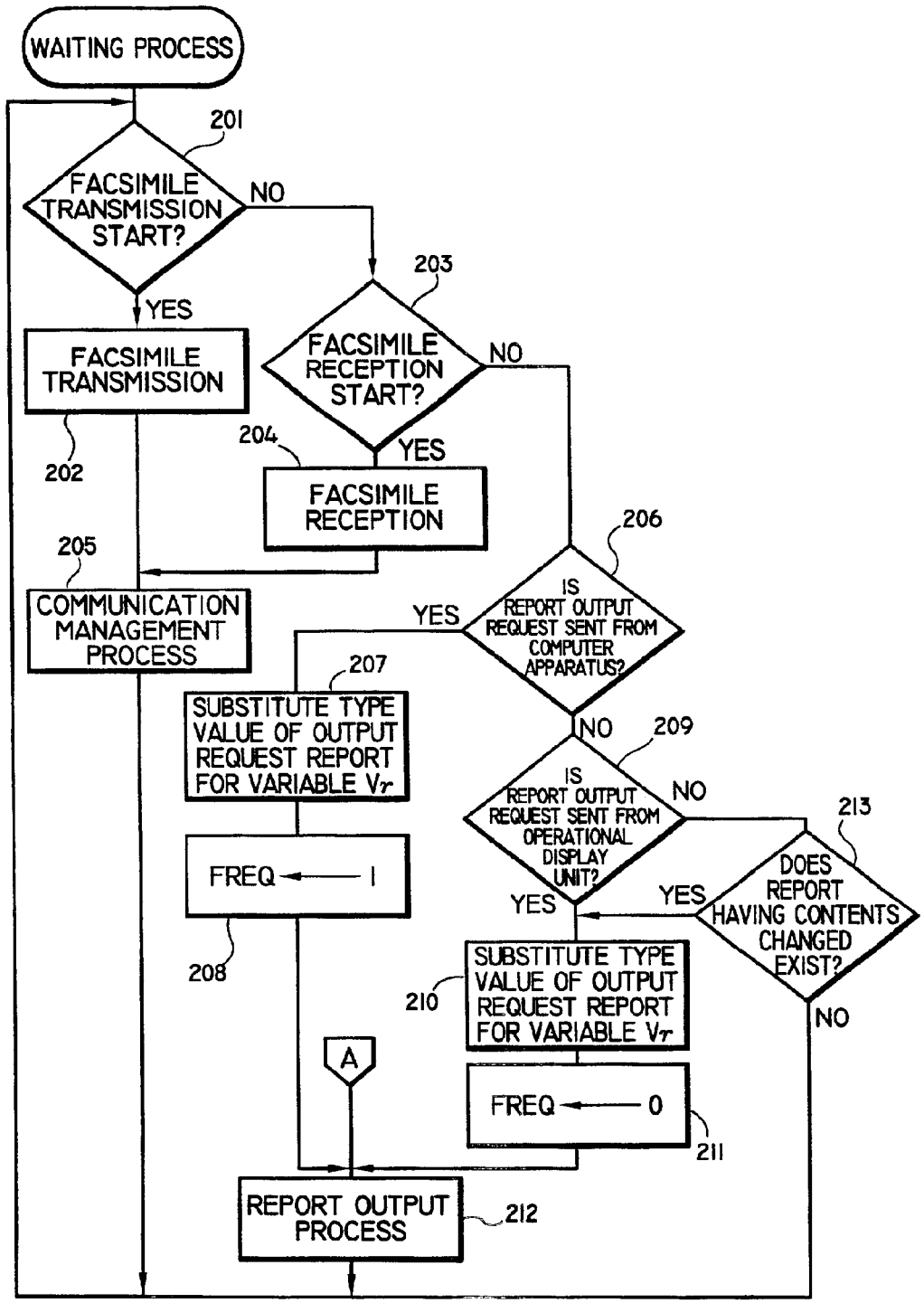
FIG. 6 is a flowchart for indicating a procedure of a waiting process in the facsimile apparatus according to the present invention.

Referring to FIG. 6, after the process 207 is performed, "1" is substituted for an output request flag Freq (Flagrequest) (process 207), and a report output process (process 212) described later is performed.

If it is determined, in determination 206, that there is no report output request from the computer apparatus 104 (No of determination 206), it is then determined whether or not there is a report output request by an input operation through the operational display unit 4 (determination 209). At this time, the report output request by the input operation through the operational display unit 4 is achieved by pressing one of the report output request keys provided in the operational display unit 4, the report output request keys including keys corresponding to output request report types which are "communication management report", "user parameter list", "one-touch dial registration list", "program registration list" and "file list". The output request report types are represented by values "1" to "5" as shown in FIG. 7B.

If there is no report output request from the operational display unit 4 (No of determination 209), a check is made whether or not there is a report in which contents of setting has been changed (determination 213). The reports having contents which can be changed are the "user parameter list", the "one-touch dial registration list" and the "program registration list" in which contents can be changed by a user. The "communication management report" and the "file list" are not included in the reports having setting contents which can be changed. This is because the user desires to check the new setting contents after the report contents which can be changed are changed, whereas it is inconvenient for the user if the "communication management report" or "file list", which is a report having contents to be changed each time a communication is performed, is automatically output for each communication.

If there is a report output request from the operational display unit 4 (Yes of determination 209), or if there is a report in which setting contents are changed (Yes of determination 213), the output request report type value specified by the report output request key being pressed or the output request report value corresponding to the report in which setting contents have been changed is substituted for the variable Vr (process 210). Then, "0" is substituted for the output request flag Freq (process 211), and a report output process described later is performed (process 212).

The output request flag Freq is referred to by a process described later. Additionally, after a communication management process (process 205) or the report output process (process 212) is completed, or if a result of determination 213 is negative, the routine returns to determination 201, and the waiting process is repeated.

A description will now be given, with reference to FIG. 8, of a detailed procedure of the communication management process (process 205) in the waiting process shown in FIG. 6.

The procedure shown in the figure is a process performed after a facsimile transmission (process 202) in the waiting process shown in FIG. 6 or a facsimile reception (process 204) is completed. First, communication management information with respect to a facsimile transmission or reception performed immediately before is stored in the RAM 3 as a single file (process 301). Accordingly, the number of files of the communication management information stored in the RAM 3 is increased one by one each time the communication operation of a facsimile transmission or reception is performed in the waiting process shown in FIG. 6.

The communication management information of each communication stored at this time includes date and time of a transmission or reception, a facsimile number or a name of a remote party which is announced by the remote facsimile apparatus in a protocol procedure of the facsimile communication, whether the communication mode is G3 or G4, a resolution of transmitted or received image information, communication time, a number of pages of the transmitted or received image information and whether the result of transmission is normal or abnormal.

In the process 301, after a single file of the communication management information is additionally stored, the number of stored communications for management information is incremented by one (process 302). The number of stored communications for management information is stored in the RAM 3. Then, the number of stored communications for management information is checked (process 303), and if the number of stored information coincides with a predetermined maximum number (for example, 50) (Yes of process 304), an output request report type value "1" is substituted for the variable Vr (process 305), and "0" is substituted for the flag Freq (process 306). Thereafter, the routine proceeds to the report output process 212 in the waiting process shown in FIG. 6. If the number of stored information does not coincide with the predetermined maximum number (No of determination 304), the communication management process is ended.

Accordingly, the report output process (process 212) in the waiting process shown in FIG. 6 is performed when a report output request is input from the computer apparatus 14 (Yes of determination 206), or when a report output request is input through the operational display unit 4 (Yes of determination 209), or when the number of stored communications for management information reaches a predetermined maximum number (Yes of determination 304).

A description will now be given, with reference to FIG. 9, of a detailed procedure of the report output process (process 212) in the waiting state shown in FIG. 6.

In the figure, first it is determined whether or not the value of the output destination flag Fout which has been set in the report output destination setting process shown in FIG. 5 is "1", that is, whether the computer apparatus 14 is set as the output destination of the report (determination 401).

If the value of the output destination flag Fout is not "1" (this means that the value is zero) (No of determination 401), the routine proceeds to the report data producing process of process 409 since the output destination of the report is set to the apparatus 12 itself.

If the value of the output destination flag Fout is "1" (Yes of determination 401), a value of the output request flag Freq is then checked (determination 402) since the output destination of the report is the computer apparatus 14.

The value of the output request flag Freq is set to "1" when a report output request is sent from the computer apparatus 14 (Yes of determination 206) in the waiting process shown in FIG. 6. On the other hand, the value is set to "0" when the report output request is input (Yes of determination 209), or when there is a report in which contents of setting has been changed (Yes of determination 213), or when the number of stored communications for management information reaches a predetermined maximum number (Yes of determination 304) in the communication management process shown in FIG. 8.

In other words, the value of the output request flag Freq becomes "1" when the report output request is sent from the computer 14, and the value of the output request flag Freq becomes "0" when the report output request is generated within the apparatus 12.

Accordingly, if the output request flag Freq is "1" (Yes of determination 402), this means that the report output request is sent from the computer apparatus 14. Thus, in order to announce to the computer apparatus 14 that the request is accepted, report output request acceptance data is sent to the computer apparatus 14 via the interface 13 (process 403).

If it is determined, in determination 402, that the output request flag Freq is "0" (No of determination 402), this means that the report output request for the communication management report is generated not by the computer apparatus 14 but the apparatus 12. Accordingly, there is no need to announce to the computer apparatus 14 that the communication management report output request is accepted. Thus, the routine proceeds to the process 404 without performing the process 403.

In the process 404, a reception preparation completion confirmation acknowledgement is sent to the computer apparatus 14 so as to confirm that the computer apparatus 14 is prepared for the reception.

Then, a waiting timer is set (process 405) and reception of a reception preparation completion acknowledgement, which indicates a completion of preparation for reception of the report data, is monitored until the timing operation of the waiting timer, started in the process 405, is completed (a loop of determination 406 ? No of determination 406 ? determination 407 ? No of determination 407 ? determination 406).

When the reception preparation completion acknowledgement is received from the computer apparatus 14 (Yes of determination 406), the report data is produced by performing a report data producing process (process 411) described later, and the data is output (sent) to the computer apparatus 14 via the interface 13.

If the timing operation of the waiting timer is completed without receiving the reception preparation completion acknowledgement (Yes of determination 407), it is considered that the computer 14 is not connected, or power of the computer apparatus 14 is turned off, or the computer apparatus 14 cannot send the reception preparation completion acknowledgement for some reason. That is, it is considered that the report data cannot be received in a normal condition. Thus, report output refusal data is sent to the computer apparatus 14 (process 408) so as to announce to the computer apparatus 14 that transmission of the report data is stopped. It should be noted that, in addition to the process 408, an error report may be recorded on a recording paper by the image output unit 6 or displayed on the operational display unit 4 so as to announce to the user. In such a case, an appropriate treatment can be requested to the user such as recovering the computer apparatus 14 to a state in which the report data is received in a normal condition.

After the process 408 is completed, or if the result of determination 401 is negative, a report data producing process (process 409) described later is performed, and image data of the produced report is recorded on a recording paper by the image outputting unit 6 of the apparatus (process 410). It should be noted that the image data of the produced report is not necessarily recorded by the image output unit 6, and may be visually output by displaying on the operational display unit 4.

After the process 412 is completed or the process 410 is completed, a check is made whether the value of the variable Vr is "1" (determination 413). If the value is "1" (Yes of determination 413), that is, if the report output in the process 410 or the process 412 is the "communication management report", the number of stored communications-for management information is cleared (process 414) since it cannot continue to store the communication management information which has been output due to a limitation of the a capacity of the RAM 3.

Accordingly, after that, the communication management information is stored until the stored information reaches a predetermined maximum number in the determination 304 of the communication management process shown in FIG. 8. It should be noted that the number of stored communications for management information reaches the predetermined maximum number when the report output request (output request report type value is "1") is not sent from the computer apparatus 14 in the waiting process shown in FIG. 6 and also there is no report output request (output request report type value is "1") through the operational display unit 4 in the determination 209. If the report output request (output request report type value is "1") is sent from the computer apparatus 14 (Yes of determination 206) or if there is a report output request (output request report type value is "1") through the operational display unit 4 (Yes of determination 209), the communication management report is output in the process 410 or 412 even when the number of stored communications for management information does not reach the predetermined maximum number, and the number of information reports is cleared.

Figure 9:
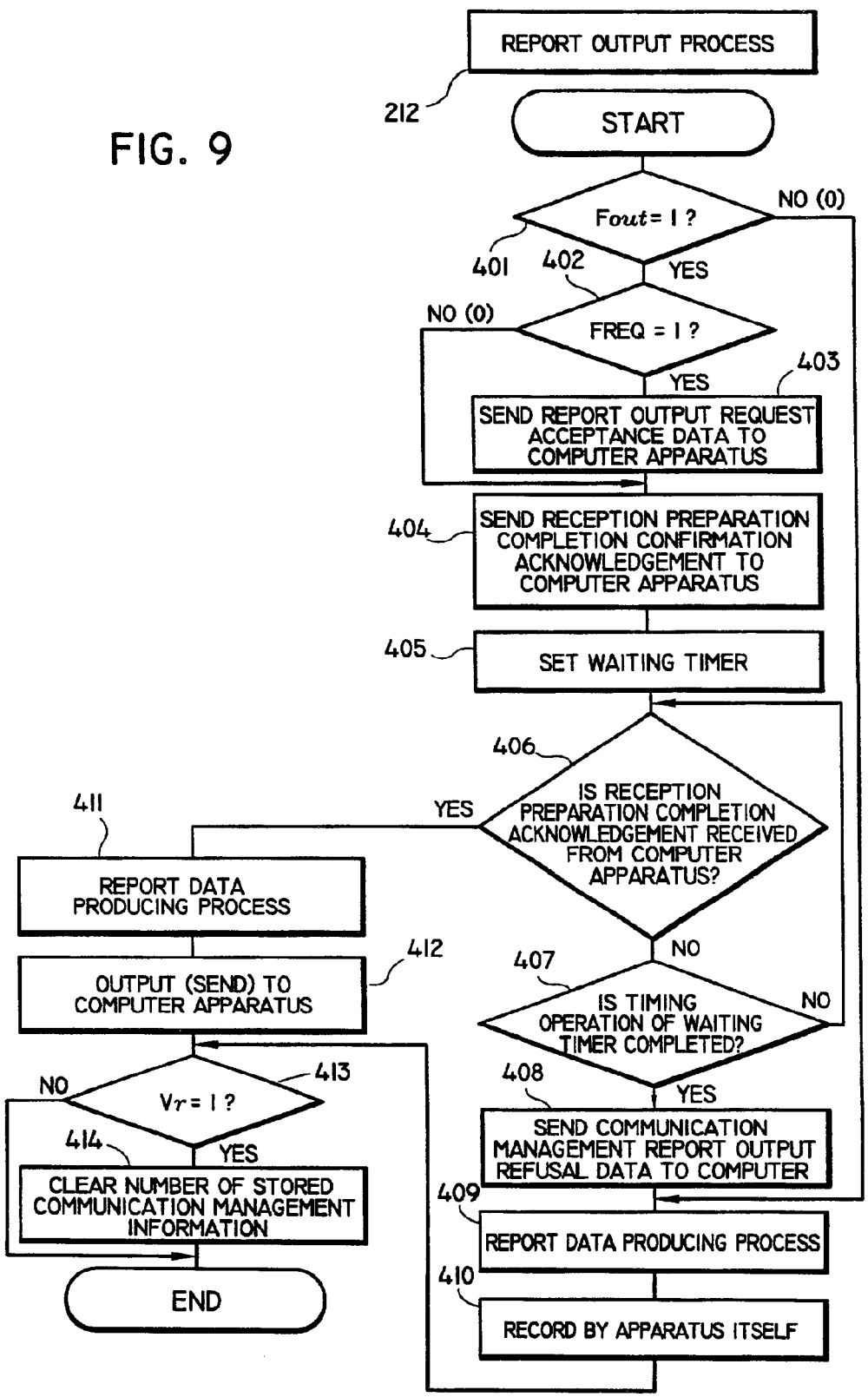
FIG. 9 is a flowchart for indicating a report output process in the facsimile apparatus according to the embodiment of the present invention.

According to the report output process shown in FIG. 9 mentioned above, the report data is output (sent) to the computer apparatus 14 when an output destination is set to the computer apparatus 14 and the computer apparatus 14 is able to receive the report data. When the computer apparatus 14 is unable to receive the report data, the report data is not output (sent) to the computer apparatus 14 but the report data is recorded by the apparatus 12 as is in a conventional apparatus. Accordingly, it can be prevented that the old communication management information which exceeds the capacity of the RAM 3 because a transmission of the communication management report cannot be performed due to the computer apparatus 14 being turned off at night time. Additionally, deletion of the communication management information without reporting to a user can be avoided.

A description will now be given, with reference to FIG. 10, of a specific procedure of the report data producing process of the process 409. In the figure, the CPU 1 checks the value of the variable Vr so as to specify the report type of the requested report (process 1001).

Then, one of the report data is produced by internal expression codes in accordance with the value of the variable Vr (process1002), the report data including the "communication management report", the "user parameter list", the "one-touch dial registration list" the "program registration list" and the "file list". The internal expression codes of the produced report are converted into a character code string having a predetermined format so as to produce character code data of the report (process 1003). Further, a font corresponding to each character code constituting the character code data of the produced report is read from the ROM 2 and develops the font on the RAM 3 so as to produce image data of the report (process 1004). It should be noted that the type of the image data of the produced report is the same as that of a facsimile image, and thus the facsimile apparatus 12 and the computer apparatus 14 can process in the same manner as the process for the facsimile image.

The image data of the produced data thus obtained is recorded on a recording paper by the image output unit 6 in the process 410 in the report output process procedure of FIG. 9.

FIGS. 22 to 26 show examples of the image data corresponding to each of the reports, that is, "communication management report", "user parameter list", "one-touch dial registration list", "program registration list" and "final list". It should be noted that the example shown in FIG. 22 is one output on the display screen of the display monitor 50 as described later. The contents is substantially the same as that recorded on a recording paper by the image output unit 6.

Figure 10:
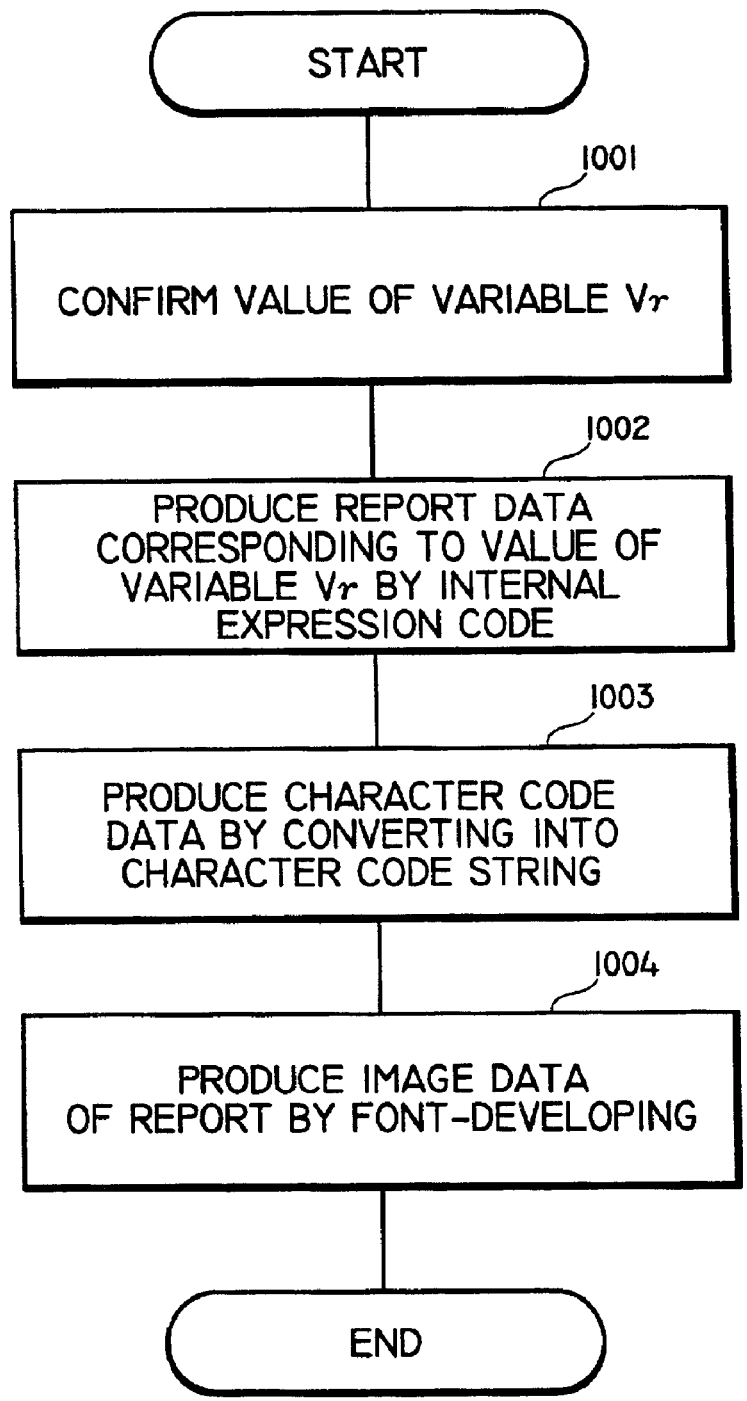
FIG. 10 is a flowchart for indicating a first example of a procedure of a report data producing process in the facsimile apparatus according to the embodiment of the present invention.

The output examples of each report shown in FIGS. 22 to 26 are constituted as an assembly of each font image, but it is constituted by a string of character codes each comprises 1 byte or 2 bytes in the stage of process 1003 in the report data producing process of FIG. 10. Additionally, the report data is constituted by the internal expression codes of the apparatus at the stage of the process 1002.

Specifically, in the example of output of the "communication management report" which is a list having contents of a file with respect to the communication management information corresponding to a communication such as a transmission or reception as shown in FIG. 22, the font image corresponding to character strings "OK" and "NG" in the item of "result" which indicates a result of communication such as a transmission or reception are represented by character code strings "79, 75" and "78, 71", respectively, each of which comprises 2 bytes (16 bits). "OK" indicates that the communication is completed in a normal condition, and "NG" indicates that the communication ended in an abnormal condition. Additionally, the character strings "OK" and "NG" are represented by "1" or "0", which is a 1-bit value, in accordance with the internal expression code.

As mentioned above, the result of communication in a file of the specific communication management information can be represented by using 1 bit according to the internal expression code, and represented by using 2 bytes (16 bits) according to the character codes. In the font image, for example, if a font comprising 16 pixels by 16 pixels per character is used, a data amount of 32 bytes (256 bits) is needed.

In the facsimile apparatus 12, when the communication management information is stored as a file, contents of the information are stored by the internal expression codes since there is no problem if the contents of the information is not easily readable. For example, in FIG. 22, a character "month" and a character "date" provided in a character string "4 month 10 date" which indicates date and time of each file communication are added when they are converted into the character code strings in order to increase readability of the character strings. Within the apparatus, such character strings are stored by the internal expression codes which are sufficient for designating one of the days included in a year. The same thing is applied to other items such as "time" which indicates a time when a communication is performed, "communication time" which indicates a time period spent on a communication, "number of pieces" which indicates a number of pages included in the transmitted or received image data and "communication mode" which indicates a line density of the transmitted or received image data and a mode of communication such as a memory transmission or a direct transmission. However, "name of remote party" is stored in the form of a character code string since this item is received from the remote apparatus in the form of the character code string.

Similarly, the internal expression codes are used for the example of a report output for "user parameter list" shown in FIG. 23 which is a list of a state of the present setting of changeable parameters for apparatuses of which settings differ from each user. Although parameters such as "automatic intensity", "line density (character size)", "transmission mode" and "reception time print" can be expressed by one bit or two bits, these parameters are converted into character strings so that a good readability is obtained. The parameter "automatic intensity" is provided for setting whether or not the image output unit 6 should perform an automatic adjustment of an image recording intensity. The parameter "line density" is provided for setting the scanning line density of the image reading unit 5 to one of a normal size character (standard), a small size character (detail) and a fine size character (fine). The parameter "transmission mode" is provided for setting, when image data is transmitted, as to whether the read image data should be directly transmitted (direct transmission) or after it has been temporarily stored in the RAM 3 (memory transmission). The parameter "reception time print" is provided for setting, when the image data is recorded by the image output unit 6 on a recording paper, as to whether the reception time is printed (on) or not printed (off).

Similarly, the internal expression codes are used for the report of the "one-touch dial registration list" shown in FIG. 24 which is a list of correspondence between each one-touch key and a name and a remote telephone number assigned to each one-touch key, the "program registration list" shown in FIG. 25 which is a list of correspondence of a communication procedure for a specific party which is assigned to a specific one-touch key and the "file list" shown in FIG. 26 which is a list of information with respect to image data stored in the RAM 3 as a file when the memory transmission is performed.

A description will now be given of first to fifth examples of the specific procedure of the report data producing process of a process 411 in the report output process procedure of FIG. 9.

The first example of the report output process procedure is the process procedure itself shown in FIG. 10 which is applied as the report data producing process of the process 409.

Thereby, image data of a report is output (sent) to the computer apparatus 14 in the process 412 in the report output process procedure shown in FIG. 9. Additionally, the type of image data of the report transmitted to the computer apparatus 14 is the same as that of a facsimile image. Thus, the computer apparatus 14 can handle the received image data of the report in a similar manner as handling of a facsimile image.

Figure 11:
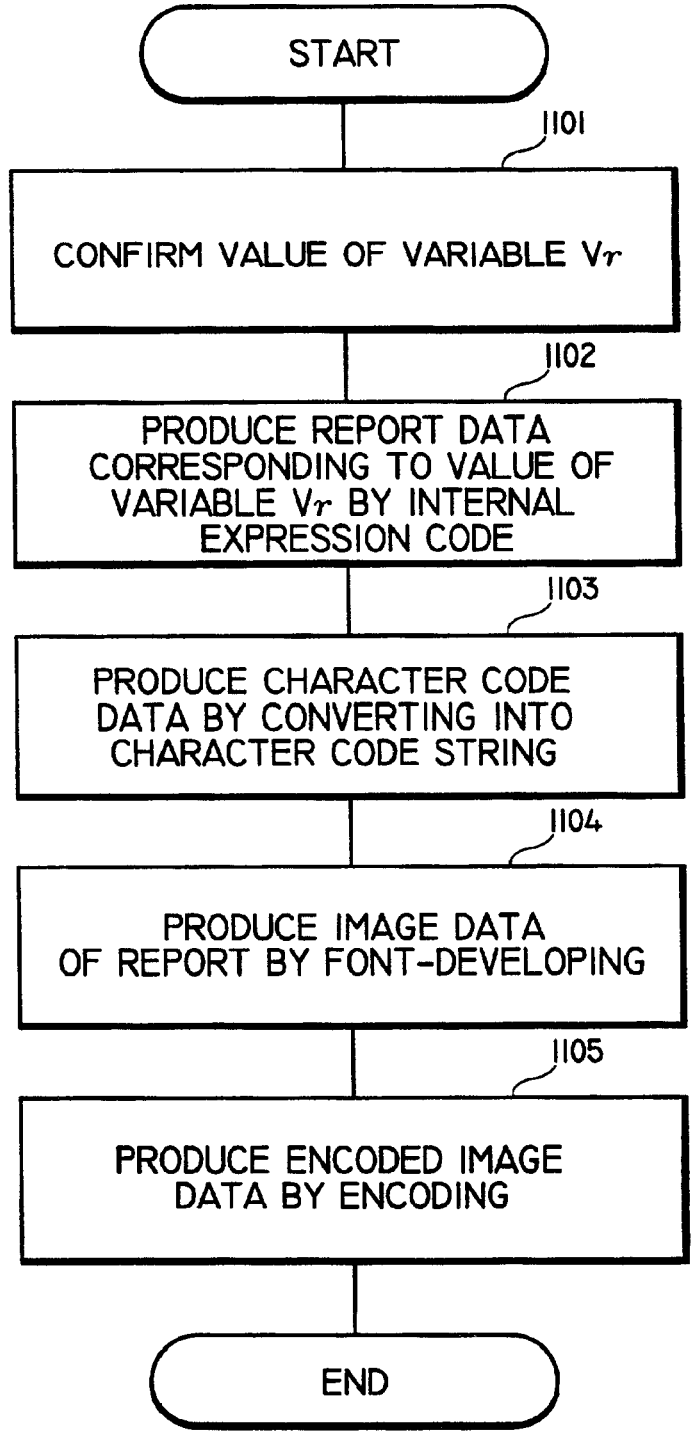
FIG. 11 is a flowchart for indicating a second example of the procedure of the report data producing process in the facsimile apparatus according to the embodiment of the present invention.

A description will now be given, with reference to FIG. 11, of the second example of the report data producing procedure.

In the figure, the CPU 1 first checks the value of the variable Vr so as to specify the type of report that is requested to be output (process 1101).

Then, one of the report data, that is, the "communication management report", the "user parameter list", the "one-touch dial registration list", the "program registration list" and the "file list", is produced by using the internal expression codes in accordance with the value of the variable Vr (process 1102). The internal expression code data of the produced data is converted into a character code having a predetermined format so as to produce character code data of the report (process 1103). Further, a font corresponding to each character code constituting the character code data of the produced report is read from the ROM 2, and is developed on the RAM 3 so as to produce image data of the report (process 1104). It should be noted that the type of the image data of the produced report is the same as that of a facsimile image.

Then, the image data of the produced report encoded by a predetermined encoding method (the MR encoding method in the present embodiment) so as to produce an encoded image data of the report (process 1105).

Thereby, the encoded image data of the report is output (sent) to the computer apparatus 14 in the process 412 of the report output process procedure of FIG. 9. Additionally, since the data transmitted to the computer apparatus 14 is the encoded image data which has a less amount of data than the original image data, the transmission time of the report data via the interface 13 can be reduced.

Figure 12:
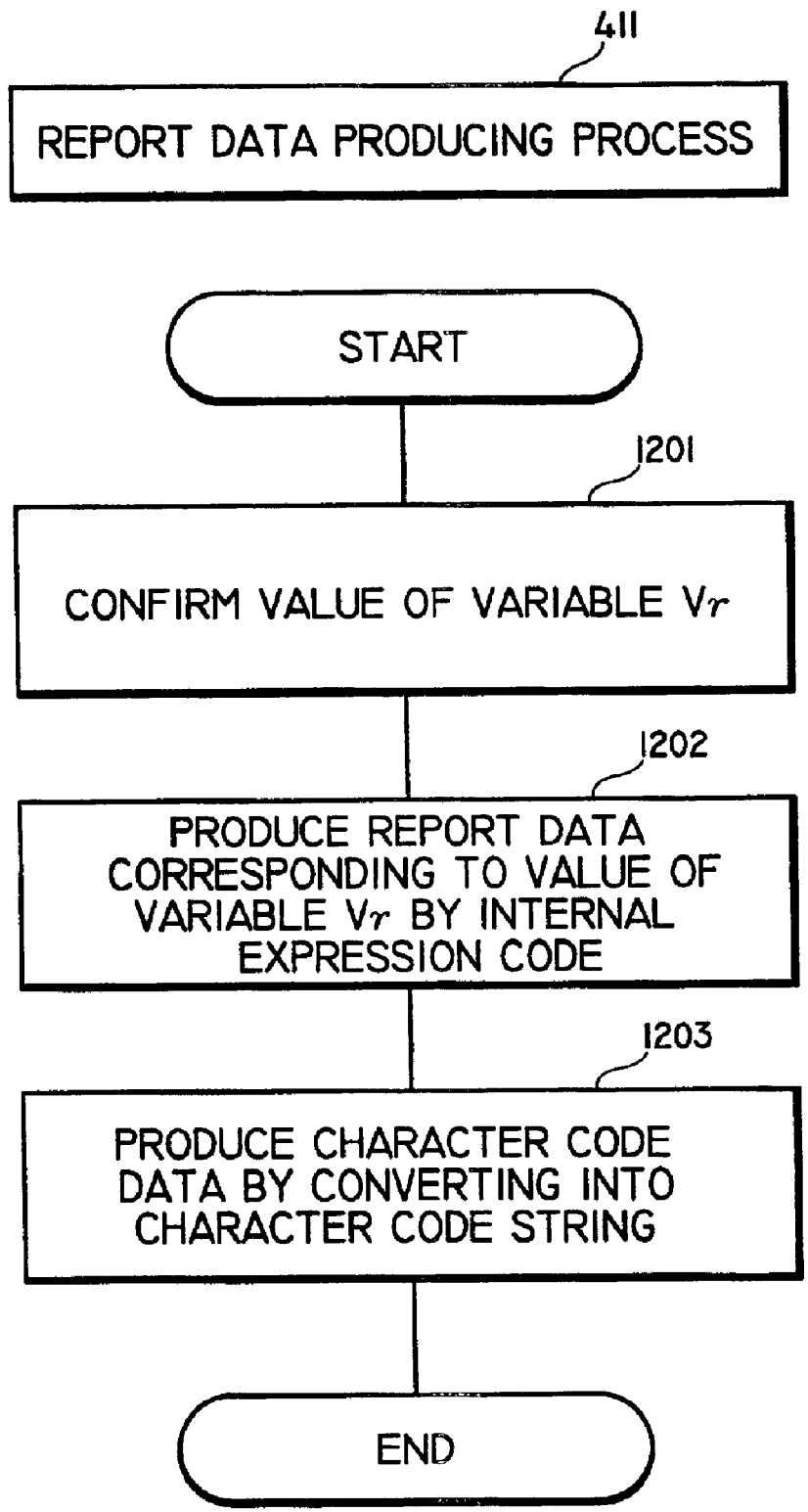
FIG. 12 is a flowchart for indicating a third example of the procedure of the report data producing process in the facsimile apparatus according to the embodiment of the present invention.

A description will now be given, with reference to FIG. 12, of the third example of the report data producing process procedure.

In the figure, the CPU 1 first checks the value of the variable Vr so as to specify the type of report that is requested to be output (process 1201).

Then, one of the report data, that is, the "communication management report", the "user parameter list", the "one-touch dial registration list", the "program registration list" and the "file list", is produced by using the internal expression codes in accordance with the value of the variable Vr (process 1202). The internal expression code data of the produced data is converted into a character code having a predetermined format so as to produce character code data of the report (process 1203).

Thereby, the encoded image data of the report is output (sent) to the computer apparatus 14 in the process 412 of the report output process procedure of FIG. 9. Additionally, since the data transmitted to the computer apparatus 14 is the encoded image data which has a less amount of data than the original image data, the transmission time of the report data via the interface 13 can be reduced.

Figure 13:
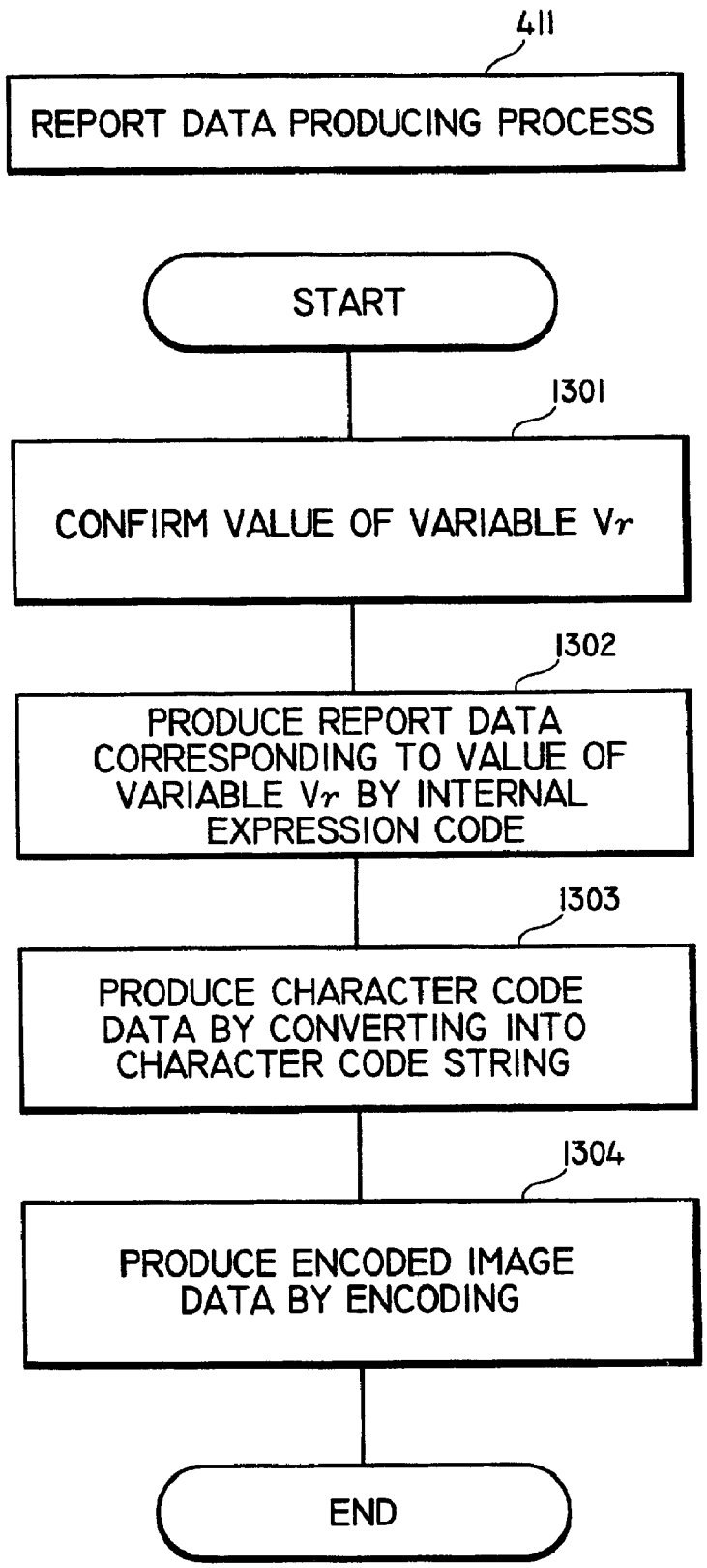
FIG. 13 is a flowchart for indicating a fourth example of the procedure of the report data producing process in the facsimile apparatus according to the embodiment of the present invention.

A description will now be given, with reference to FIG. 13, of the fourth example of the report data producing procedure.

In the figure, the CPU 1 first checks the value of the variable Vr so as to specify the type of report that is requested to be output (process 1301).

Then, one of the report data, that is, the "communication management report", the "user parameter list", the "one-touch dial registration list", the "program registration list" and the "file list", is produced by using the internal expression codes in accordance with the value of the variable Vr (process 1302). The internal expression code data of the produced data is converted into a character code having a predetermined format so as to produce character code data of the report (process 1303).

Then, the image data of the produced report is encoded by a known predetermined encoding method, such as the Huffman method, so as to produce an encoded image data of the report (process 1304).

Thereby, the encoded image data of the report is output (sent) to the computer apparatus 14 in the process 412 of the report output process procedure of FIG. 9. Additionally, since the data transmitted to the computer apparatus 14 is the encoded image data which has a less amount of data than the original image data, the transmission time of the report data via the interface 13 can be reduced.

Figure 14:
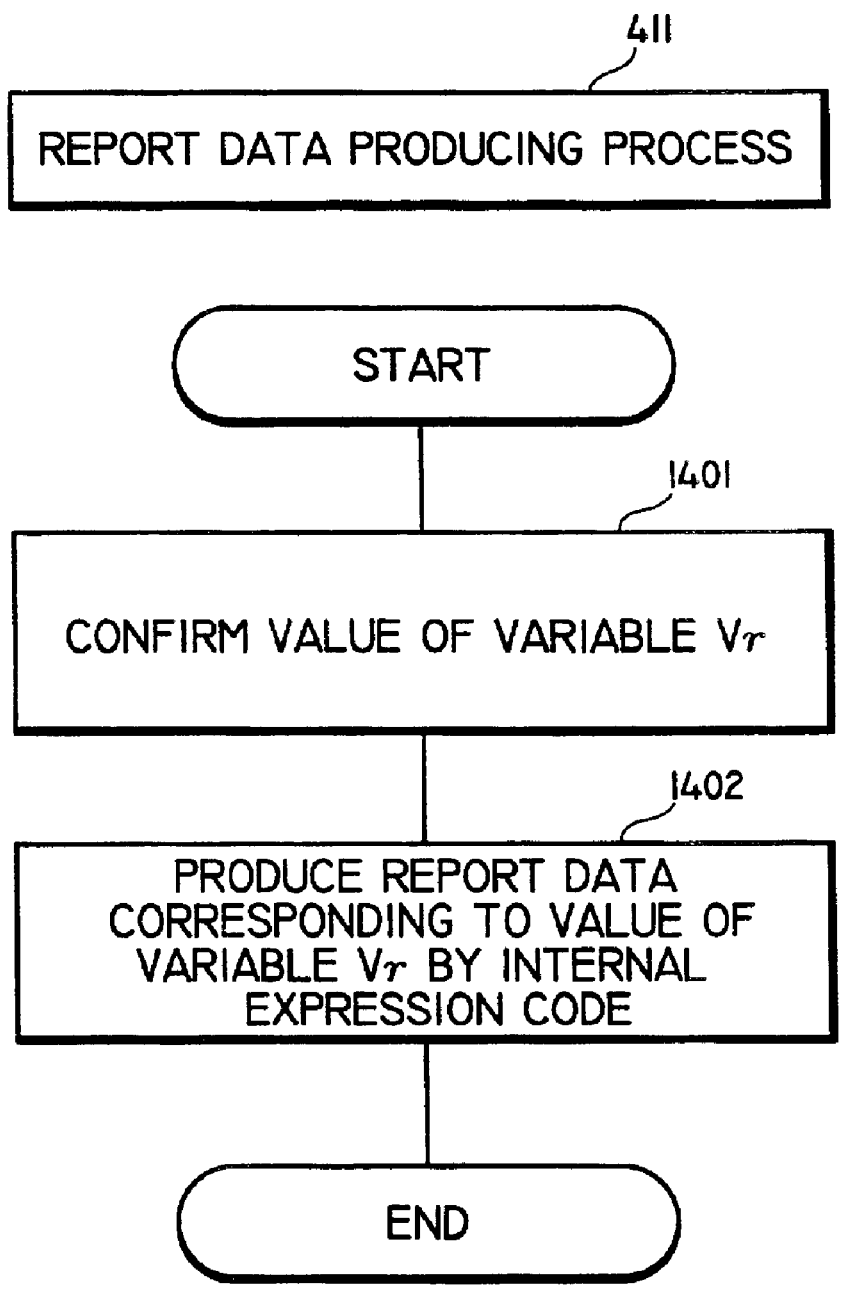
FIG. 14 is a flowchart for indicating a fifth example of the procedure of the report data producing process in the facsimile apparatus according to the embodiment of the present invention.

A description will now be given, with reference to FIG. 14, of the fifth example of the report data producing procedure.

In the figure, the CPU 1 first checks the value of the variable Vr so as to specify the type of report that is requested to be output (process 1401).

Then, one of the report data, that is, the "communication management report", the "user parameter list", the "one-touch dial registration list", the "program registration list" and the "file list", is produced by using the internal expression codes in accordance with the value of the variable Vr (process 1402). It should be noted that information for distinguishing a type of report is added to the report data produced by the internal expression code.

Thereby, the encoded image data of the report is output (sent) to the computer apparatus 14 in the process 412 of the report output process procedure of FIG. 9. Additionally, since the data transmitted to the computer apparatus 14 is the encoded image data which has a less amount of data than the original image data, the transmission time of the report data via the interface 13 can be reduced.

It should be noted that the above-mentioned first to fifth examples of the report producing process procedure are procedures started the first time when the result of determination 406 becomes Yes so as to obtain the report data which should be output (sent) to the computer apparatus 14 in the process 412 of the report output process procedure of FIG. 9. Accordingly, the same procedure is performed so as to obtain the report data to be output (sent) to the computer apparatus 14 in the process 412 even when each report data is previously produced and stored in the RAM 3 so that one of the stored report data is read in accordance with a value of the variable Vr.

A description will now be give of a process procedure performed by the computer apparatus 14 which corresponds to the above-mentioned process procedures performed by the facsimile apparatus 12.

First, a description will be given of a procedure of an active report receiving process shown in FIG. 15.

In the figure, the MPU 22 of the computer apparatus 14 sends report output request data having a format shown in FIG. 7A to the facsimile apparatus 12 via the interface 13 (process 501). This corresponds to the determination 206 in the waiting process of the facsimile apparatus 12 shown in FIG. 6. It should be noted that as for the value of the type of output request report, the corresponding value shown in FIG. 7B is set to the selected one of the "communication management report", the "user parameter list", the "one-touch dial registration list", the "program registration list" and the "file list" which is to be output. The selection of the output request report may be performed manually by a user by an operational input through the keyboard 40 or a click operation by the mouse device 60 on an icon displayed on the display monitor 50. Alternatively, the MPU 22 may automatically select each of the "communication management report", the "user parameter list", the "one-touch dial registration list", the "program registration list" and the "file list" sequentially, as the output request report, each time a previously set predetermined period (for example, one month) has passed.

Then, a response waiting timer is-set (process 502), and monitors a reception of report output acceptance data from the facsimile apparatus 12 (determination 503). The determination 503 corresponds to the process 403 of the report output process performed by the facsimile apparatus shown in FIG. 9.

If it is determined in the determination 503 that the report output request acceptance data is not received (No of determination 503), a reception of report output refusal data from the facsimile apparatus 12 is monitored (determination 504). The determination 504 corresponds to the process 408 of the report output process of FIG. 9. If it is determined, in the determination 504, that the report output refusal data is received (Yes of determination 504), the routine is ended since the report data responding to the report output request in the-process 501 will not be transmitted from the facsimile apparatus 12.

If the report output refusal data is not received in determination 504 (Yes of determination 504), it is then checked, in determination 505, whether the timing operation of the response waiting timer set in the process 502 is completed. If the timing operation is completed (Yes of determination 505), the process is ended. If-the timing operation is not completed (No of determination 505), the process returns to the determination 503.

If the report output request acceptance data is received from the facsimile apparatus 12 in the determination 503 (Yes of determination 503), that is, if a response of acceptance is sent from the facsimile apparatus 12 with respect to the report output request sent to the facsimile apparatus 12 in the process 501, a reception preparation completion acknowledgement is sent to the facsimile apparatus 12 (process 506). The process 506 corresponds to the determination 406 of the report output process of FIG. 9.

Then, the report data transmitted from the facsimile apparatus 12 is received (process 507). The process 507 corresponds to the process 412 of the report output process of FIG. 9. It should be noted that a specific procedure of the report receiving process of the process 507 will be described later.

Thereby, the computer apparatus 14 can receive the report data from the facsimile apparatus 12 by requesting a transmission of the report data to the facsimile apparatus 12.

Figure 15:
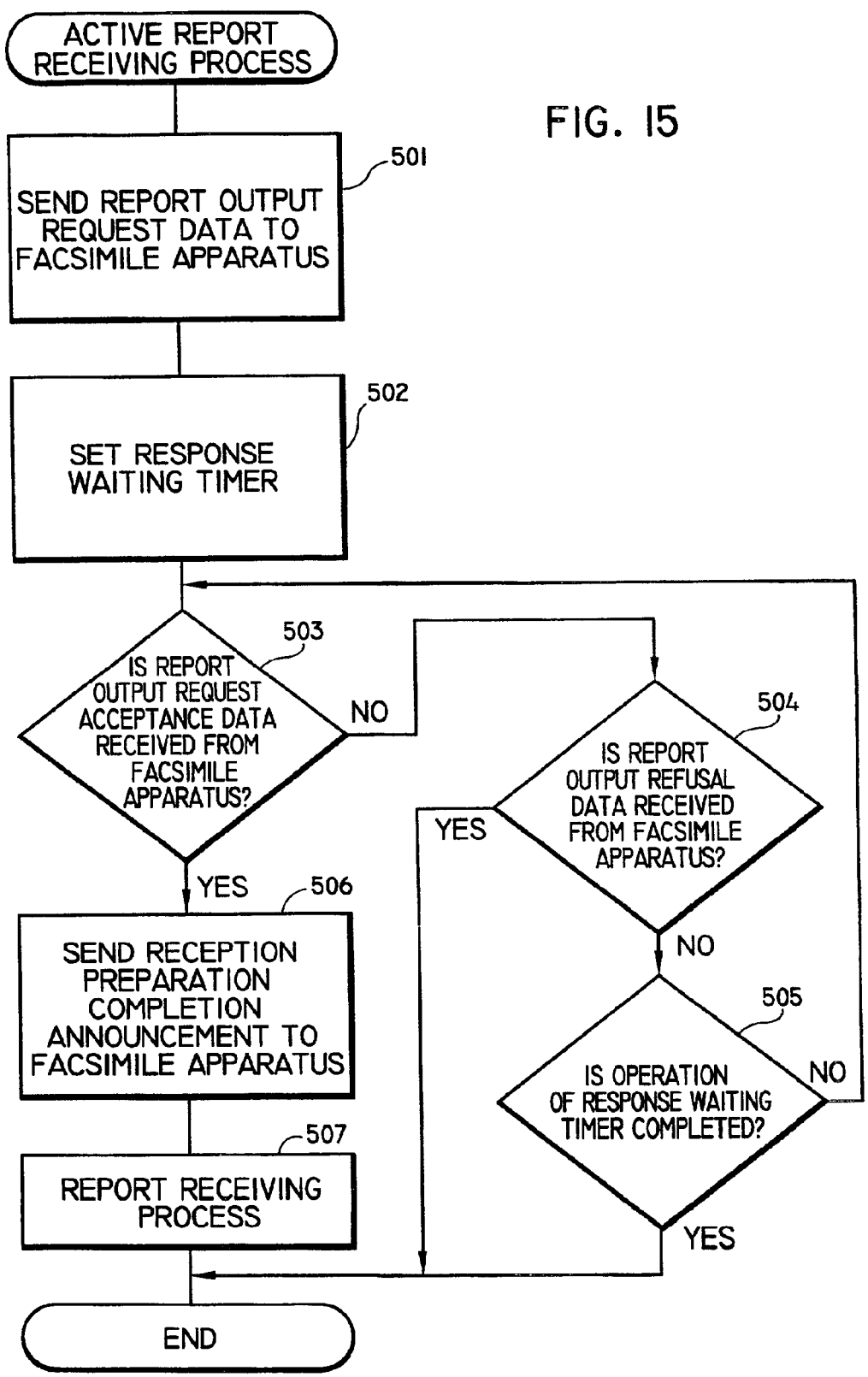
FIG. 15 is a flowchart for indicating a procedure of an active report receiving process in the computer apparatus according to the embodiment of the present invention.

The active report output request process shown in FIG. 15 is for requesting an output of the report from the computer apparatus 14 to the facsimile apparatus 12. This corresponds to a condition in which the value of the output request flag Freq is "1". However, there is a case in which the value of the output request flag Freq is "0", that is, the report data is output (sent) to the computer apparatus 14 due to the output request from the facsimile apparatus. A process procedure corresponding to such a case is a passive report receiving process procedure shown in FIG. 16 which will be described below.

In the figure, the MPU 22 of the computer apparatus 14 monitors a reception of a reception preparation completion confirmation acknowledgement which is sent from the facsimile apparatus 12 via the interface 13 (a No loop of determination 601). The determination 601 corresponds to the process 404 of the report output process shown in FIG. 9 which is performed by the facsimile apparatus 12.

If the reception preparation completion confirmation acknowledgement is received from the facsimile apparatus 12 (Yes of determination 601), a reception preparation completion acknowledgement is sent to the facsimile apparatus 12 (process 602). The process 602 corresponds to the determination 406 of the report output process of FIG. 9.

Then, the report data transmitted from the facsimile apparatus 12 is received (process 603). The process 603 corresponds to the process 412 of the report output process of FIG. 9. It should be noted that a specific procedure of the process 603 of the report receiving process will be described later.

Accordingly, the computer apparatus 14 can receive the report data corresponding to the report output request issued by the facsimile apparatus 12.

Figure 16:
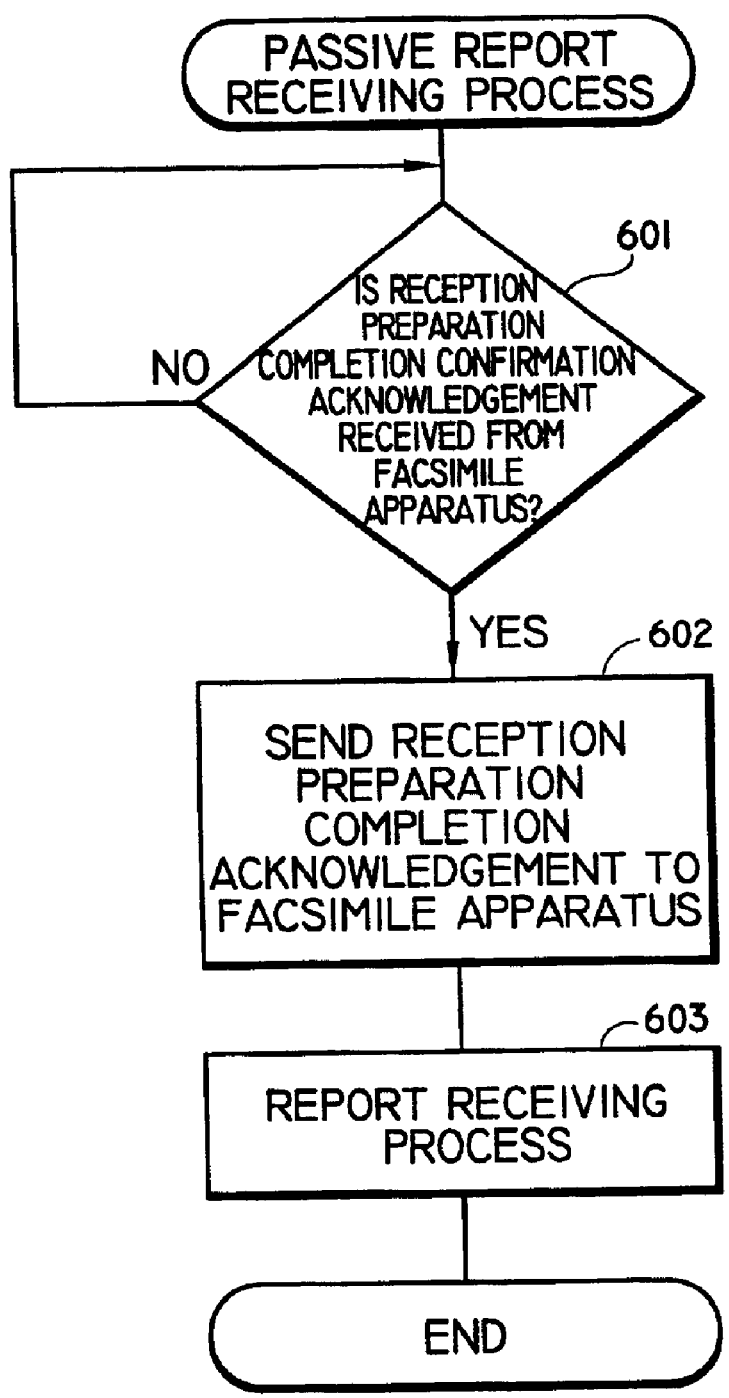
FIG. 16 is a flowchart for indicating a procedure of a passive report receiving process in the computer apparatus according to the embodiment of the present invention.

A description will now be given of first to fifth examples of the specific procedure of the report receiving process which can be applied as the process 507 in the active report receiving process procedure shown in FIG. 15 or the passive report receiving process in the process 603 shown in FIG. 16. It should be noted that the first to fifth examples of the report receiving process procedure correspond to the first to fifth examples of the report data producing process procedure shown in FIGS. 10 to 14, respectively.

Figure 17:
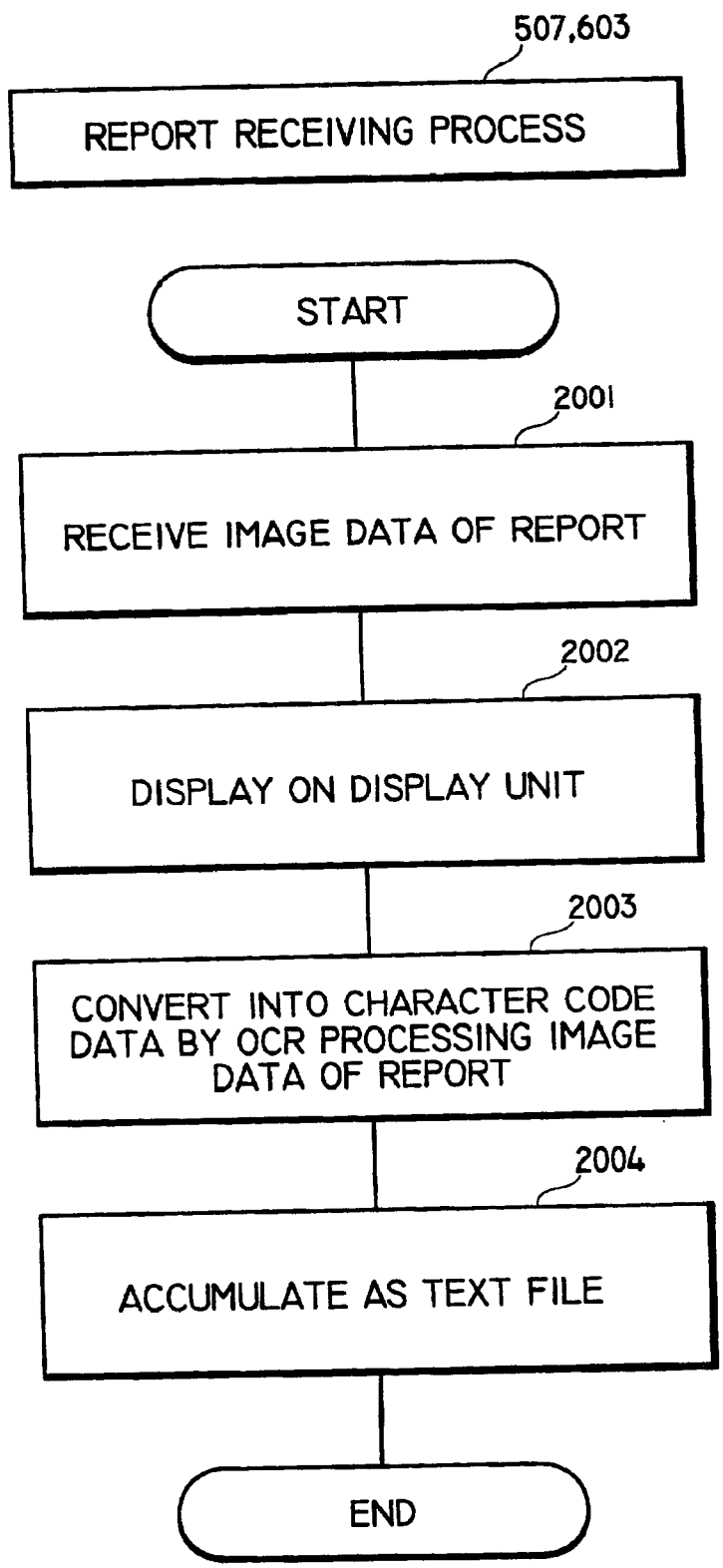
FIG. 17 is a flowchart for indicating a first example of a procedure of a report receiving process in the computer apparatus according to the embodiment of the present invention.

First, a description will be given, with reference to FIG. 17, of the first example of the report receiving process procedure.

In the figure, the MPU 22 receives the image data of the report which is sent from the facsimile apparatus 12 via the interface 13 (process 2001). Then, the received image data is displayed on the display screen 50a of the display monitor 50 without being processed (process 2002). FIG. 22 shows an example of the report (in this case, the communication management report) displayed on the display screen 50a. Additionally, contents which are the same as that of record outputs of various types of records shown in FIGS. 23 to 26 are displayed in accordance with the type of report of the image data of the received report.

Further, the image data of the received report is subjected to an OCR process so as to convert it into character code data (process 2003), and is stored in the hard disc apparatus 28 as a text file for later use (process 2004).

As mentioned above, information related to operations of the apparatus such as the communication management information of the apparatus 12 can be systematically processed by the computer apparatus 14 receiving the report data. Additionally, since there is no need to record the report data on a recording paper by the facsimile apparatus 12, the amount of recording paper to be used can be saved. Further, since the report data sent to the computer apparatus 14 is transmitted as a facsimile image, the computer apparatus 14 can handle the report data in the same manner as that applied to the conventional facsimile image. However, if the computer apparatus 14 is provided with a function converting a facsimile image into an image of a type which the computer apparatus 14 can handle, such image can be handled. It should be noted that the image data of the report may not be converted into the character code data by the OCR process but the image data may be stored as a file without being processed.

Figure 18:
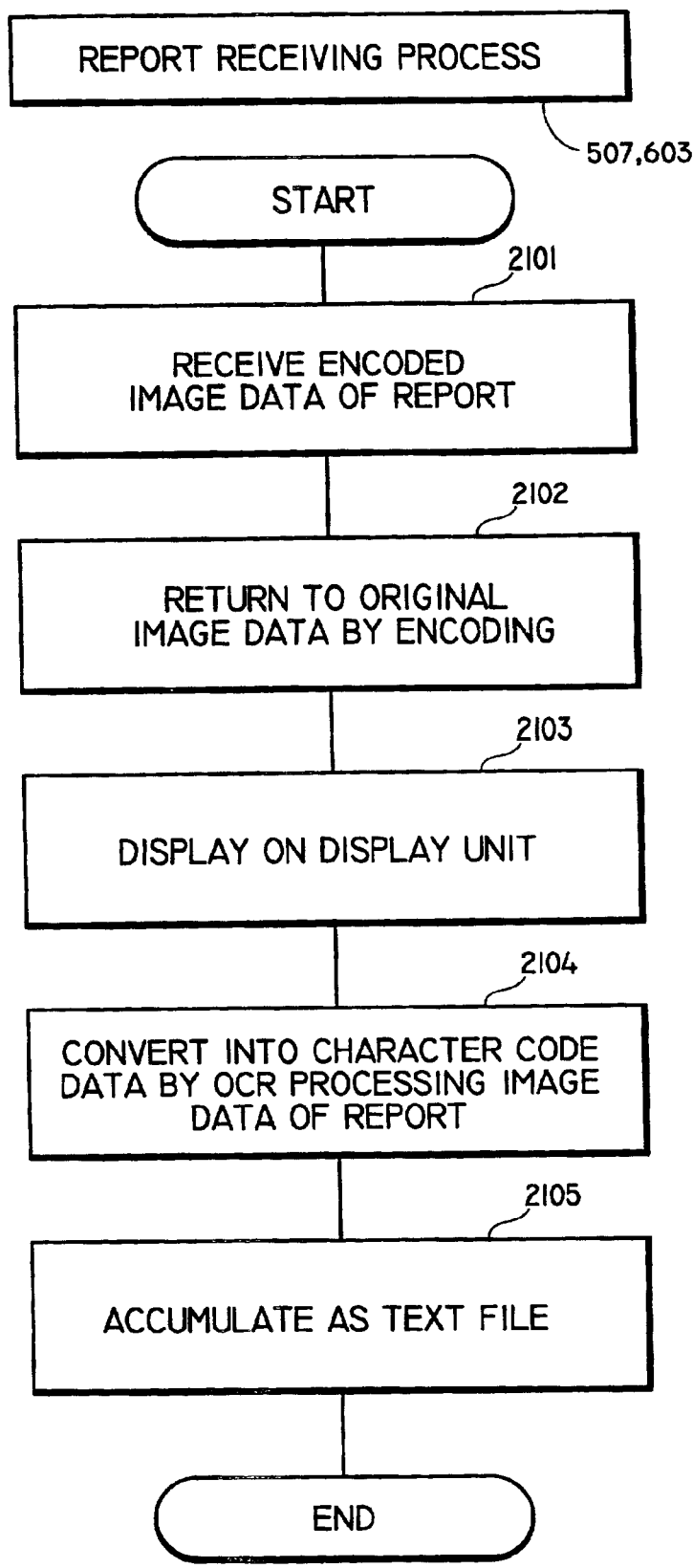
FIG. 18 is a flowchart for indicating a second example of the procedure of the report receiving process in the computer apparatus according to the embodiment of the present invention.

A description will now be given, with reference to FIG. 18, of the second example of the report receiving process procedure.

In the figure, the MPU 22 receives the encoded image data of the report which is sent from the facsimile apparatus 12 via the interface 13 (process 2101). Then, the received encoded image data is decoded by a predetermined decoding method corresponding to the MR encoding method so as to return it to the original image data (process 2101), and the image data is displayed on the display screen 50a of the display monitor (process 2103).

As mentioned above, since the report data is received as the encoded image data, a transmission time of the report data can be reduced. It should be noted that the encoded image data of the report is not necessarily converted into the character code data by the OCR process after it is returned to the original data, but the encoded image may be stored as a file without being processed.

Figure 19:
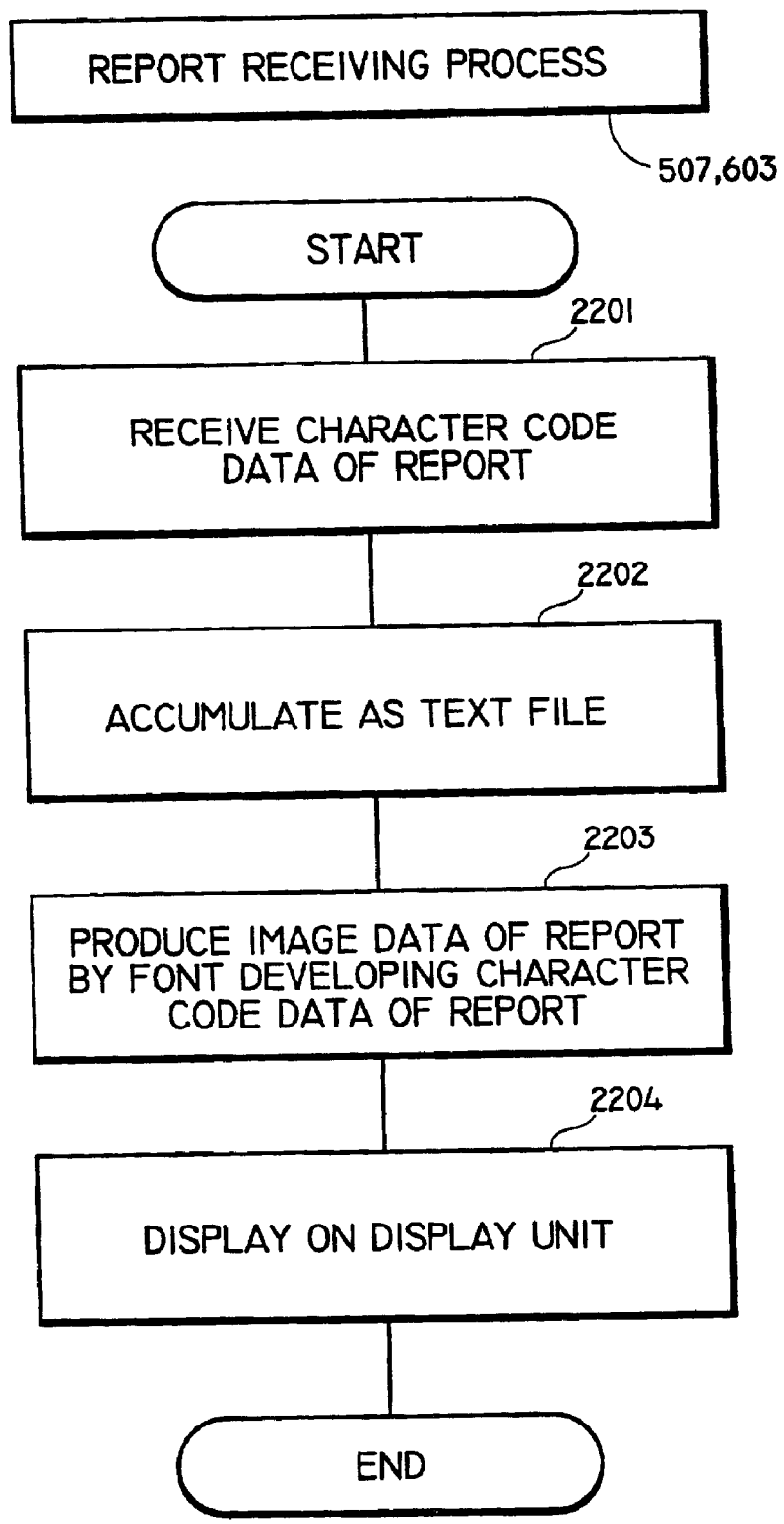
FIG. 19 is a flowchart for indicating a third example of the procedure of the report receiving process in the computer apparatus according to the embodiment of the present invention.

A description will now be given, with reference to FIG. 19, of the third example of the report receiving process procedure.

In the figure, the MPU 22 receives the character code data of the report which is sent from the facsimile apparatus 12 via the interface 13 (process 2201). Then, the received character code data is stored in the hard disc apparatus 28 as a text file for later use (process 2202).

Then, the font data corresponding to each character code constituting the character code data of the received report is developed on the RAM 27 so as to produce image data of the report (process 2203), and the image data is displayed on the display screen 50a of the display monitor 50 (process 2104). It should be noted that the correspondence between each character code and the font developed from the character code must conform to the correspondence in the facsimile apparatus 12. Accordingly, the computer apparatus 14 stores a font file in the hard disc apparatus 28, the font file being a correspondence table which has the same contents with the correspondence table between character code and the font data which is stored in the RAM 2 of the facsimile apparatus 12. However, even if the contents of the correspondence table of font in the computer apparatus 14 is different from that of the correspondence table of the facsimile apparatus 12, such a condition can be handled by previously preparing a character code conversion table which interpolates the difference between those correspondence tables. It should be noted that there is no problem if a style of type of the font of the facsimile apparatus 12 differs from that of the computer apparatus 14, for example, one can be a Ming-cho type and the other can be a Gothic type.

As mentioned above, since the report data is received as the character code data, the transmission time of the report data can be reduced. Additionally, it cannot happen that the text data of the report stored as a file inclusion of erroneous contents due to an error in the OCR process.

Figure 20:
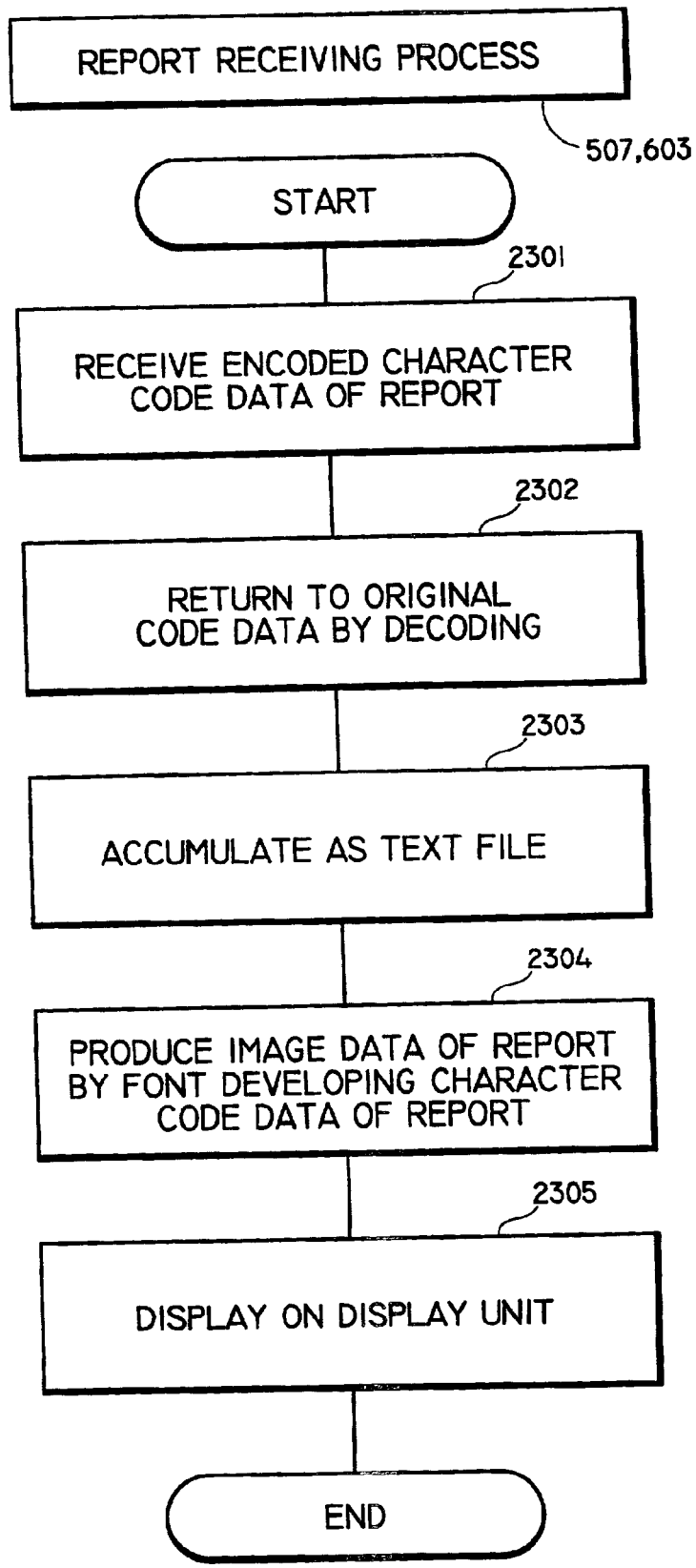
FIG. 20 is a flowchart for indicating a fourth example of the procedure of the report receiving process in the computer apparatus according to the embodiment of the present invention.

A description will now be given, with reference to FIG. 20, of the fourth example of the report receiving process procedure.

In the figure, the MPU 22 receives the encoded character code data of the report which is sent from the facsimile apparatus 12 via the interface 13 (process 2301). Then, the received encoded character code data is decoded by a predetermined decoding method corresponding to the MR encoding method so as to return it to the original image data (process 2302). Then, the decoded character data is stored in the hard disc apparatus 28 as a text file for a later use (process 2303).

Then, the font data corresponding to each character code constituting the character code data of the report is developed on the RAM 27 so as to produce image data of the report (process 2304), and the image data is displayed on the display screen 50a of the display monitor 50 (process 2305).

As mentioned above, since the report data is received as the encoded character code data, the transmission time of the report data can be reduced. Additionally, the encoded character code data is not necessarily stored as a text file after it is decoded, but the encoded character code data may be stored as a file without being processed.

Figure 21:
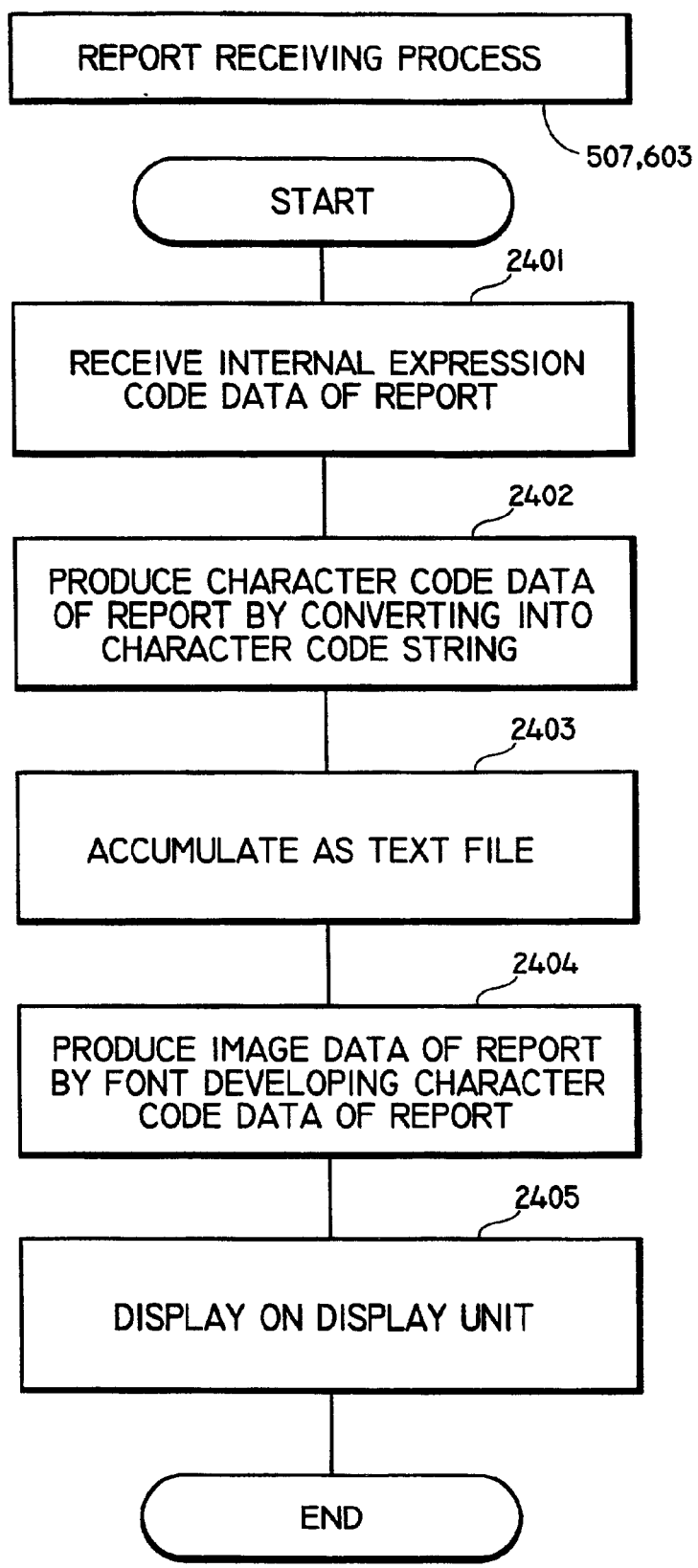
FIG. 21 is a flowchart for indicating a fifth example of the procedure of the report receiving process in the computer apparatus according to the embodiment of the present invention.

A description will now be given, with reference to FIG. 21, of the fifth example of the report receiving process procedure.

In the figure, the MPU 22 receives the internal expression code data of the report which is sent from the facsimile apparatus 12 via the interface 13 (process 2401). Then, the received internal expression code data is converted into character code strings by a rule that is the same as the conversion rule in the facsimile apparatus 12 so as to produce the character code data of the report (process 2402). Then, the produced character code data is stored in the hard disc apparatus 28 as a text file for a later use (process 2403).

Then, the font data corresponding to each character code constituting the character code data of the produced report is developed on the RAM 27 so as to produce image data of the report (process 2404), and the image data is displayed on the display screen 50a of the display monitor 50 (process 2405).

As mentioned above, since the report data is received as the internal expression code data, the transmission time of the report data can be reduced. Additionally, since the report data is received as the internal expression code, specific contents of the report data can be recognized by the computer apparatus 14. By utilizing this, as an example of output of the "communication management report" shown in FIG. 22, for example, a character string produced from the internal expression code data may be provided with decoration by various display functions provided in the computer apparatus 14. That is, the character string "NG", which is provided in the item indicating the result of communication (value is "0" by the internal expression code), may be displayed by a bold style of type so as to clearly distinguish it from the character string "OK" (value is "1" by the internal expression code), or the character code "NG" may be displayed in red or may blink whereas the character code "OK" is displayed in green. It should be noted that the internal expression code data is not necessarily stored as a text file after the character code data is produced from the internal expression code data, but the internal expression code data may be stored as a file without being processed.

It should be noted that, in the first to fifth examples of the report receiving process procedure, when the report data is stored as a file in the hard disc apparatus 28, data such as the date and time when the file is stored may be added to the report data so as to include it in the contents of the file, or the file name may include the date and time of the file when it is stored. In such a case, there is merit in that the reference to the file is facilitated when the report data is used at a later time.

Additionally, in the above-mentioned embodiment, although the present invention is applied to the structure in which a facsimile apparatus is one of a plurality of communication terminals connected to a computer apparatus via an interface, a communication terminal to which the present invention can be applied is not limited to the facsimile apparatus, and the present invention can also be applied to other communication terminals such as a data communication modem which can exchange data with a computer apparatus via an interface.

In the above-mentioned embodiment, the "communication management report" and the "file list" are referred to as examples of a report which is based on the communication management information. Additionally, the "user parameter list", the "one-touch dial registration list" and the "program registration list" are referred to as a report which is based on setting contents of the apparatus. However, in addition to that, as a report which includes the communication management information and the contents of setting of the apparatus, the "shortened dial registration list" and the "fare management report" can be referred to. The present invention can also be applied to a report based on information related to such other operations of the apparatus.

The present invention is not limited to the specifically disclosed embodiments, and variations and modifications may be made without departing from the scope of the present invention.

What is claimed is:

1. A communication apparatus connected to a remote communication apparatus via a communication medium and also connected to a computer apparatus, said communication apparatus comprising:

report accumulating means for accumulating report data which are based on plural sets of information related to transmission and/or reception operations to and from said remote communications apparatus; and report sending means for sending the report data accumulated in said report accumulating means to said computer apparatus, wherein said report sending means sends the report data in response to a report sending request given from said computer apparatus at a predetermined time interval, each of the plural sets of information is information regarding the communication apparatus alone and cumulatively stored at a different time, the report accumulating means cumulatively stores each set of information related to transmission and/or reception operations, and the report sending means sends the cumulative information as the report data in response to the report sending request.

2. The communication apparatus as claimed in claim 1, wherein said communication apparatus is connected to said computer apparatus via an interface, and the report sending request is sent from said interface.

3. The communication apparatus as claimed in claim 2, further comprising report output destination setting means capable of being set by said communication apparatus and said computer apparatus for setting whether report data is to output to a user at the communication apparatus itself or at the computer apparatus.

4. The communication apparatus as claimed in claim 1, wherein said communication apparatus is connected to said computer via a network, and the report sending request is sent from said computer apparatus via said network.

5. The communication apparatus as claimed in claim 4, further comprising report output destination setting means capable of being set by said communication apparatus and said computer apparatus for setting whether report data is to output to a user at the communication apparatus itself or at the computer apparatus.

6. A computer program causing a communication apparatus, which is connected to a remote communication apparatus via a communication medium and also connected to a computer apparatus, to perform the steps of:

accumulating report data which are based on plural sets of information related to transmission and/or reception operations to and from said remote communications apparatus;

cumulatively storing each set of information related to transmission and/or reception operations; and sending the accumulated report data to said computer apparatus in response to a report sending request given from said computer apparatus at a predetermined time interval, wherein each of the plural sets of information is information regarding the communication apparatus alone and cumulatively stored at a different time, and the cumulatively stored information is sent as the report data in response to the report sending request.

* * * * *